(12) United States Patent
Meyer et al.

(10) Patent No.: US 8,480,533 B2
(45) Date of Patent: Jul. 9, 2013

(54) MULTI-SPEED TRANSMISSION

(75) Inventors: Kevin Gerard Meyer, Germantown Hills, IL (US); James Stephen Rice, Deer Creek, IL (US); Peter Hall Hodges, Peoria, IL (US); Larry Wayne Carpenter, Peoria, IL (US); Kevin Jay Knox, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 240 days.

(21) Appl. No.: 12/915,296

(22) Filed: Oct. 29, 2010

(65) Prior Publication Data

US 2011/0124462 A1 May 26, 2011

Related U.S. Application Data

(60) Provisional application No. 61/264,480, filed on Nov. 25, 2009.

(51) Int. Cl.
*F16H 3/62* (2006.01)

(52) U.S. Cl.
USPC ........................................ 475/276

(58) Field of Classification Search
None
See application file for complete search history.

(56) References Cited

U.S. PATENT DOCUMENTS

| | | | |
|---|---|---|---|
| 6,976,930 B2 | 12/2005 | Winzeler | |
| 7,441,643 B2 | 10/2008 | McCunn et al. | |
| 7,549,942 B2 | 6/2009 | Gumpoltsberger | |
| 7,556,582 B2 | 7/2009 | Gumpoltsberger | |
| 7,566,283 B2 | 7/2009 | Gumpoltsberger | |
| 7,575,533 B2 | 8/2009 | Gumpoltsberger | |
| 8,052,566 B2 * | 11/2011 | Wittkopp et al. | 475/275 |
| 8,070,646 B2 * | 12/2011 | Hart et al. | 475/280 |
| 8,083,630 B2 * | 12/2011 | Rice et al. | 475/280 |
| 8,096,915 B2 * | 1/2012 | Wittkopp et al. | 475/282 |
| 2006/0205556 A1 | 9/2006 | Klemen | |
| 2007/0072732 A1 | 3/2007 | Klemen | |
| 2008/0070740 A1 | 3/2008 | Gumpoltsberger | |
| 2008/0125269 A1 | 5/2008 | Gumpoltsberger | |
| 2009/0036252 A1 | 2/2009 | Phillips et al. | |

FOREIGN PATENT DOCUMENTS

| | | |
|---|---|---|
| DE | 102007055808 A1 | 6/2009 |
| DE | 102008000207 A1 | 8/2009 |
| KR | 812443 B1 | 3/2008 |
| KR | 1020090097635 | 9/2009 |
| WO | 2009077363 | 6/2009 |

* cited by examiner

*Primary Examiner* — Dirk Wright
(74) *Attorney, Agent, or Firm* — Miller, Matthias & Hull

(57) ABSTRACT

A multi-speed transmission may include an input member and an output member disposed in a housing. A first planetary gear set, a second planetary gear set, a third planetary gear set, and a fourth planetary gear set may also be disposed in the housing, each planetary gear set including a sun gear, a planet carrier, and a ring gear. Six control elements may be operably coupled to the planetary gear sets and selectively engageable to create a set of different gear ratios between the input member and the output member, the set of different gear ratios including at least nine forward gear ratios and at least two reverse gear ratios.

20 Claims, 36 Drawing Sheets

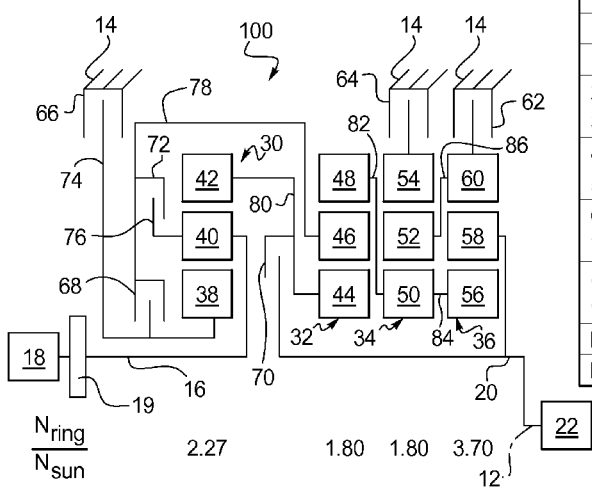

| | Ratio | Step | | Clutches | | | Brakes | | |
|---|---|---|---|---|---|---|---|---|---|
| | | | | 68 | 70 | 72 | 62 | 64 | 66 |
| 1F | 6.93 | 1F/9F | 9.46 | | | | x | x | x |
| 2F | 4.95 | 1F/2F | 1.40 | | | x | x | x | |
| 3F | 4.10 | 2F/3F | 1.21 | | x | | x | x | |
| 4F | 3.00 | 3F/4F | 1.37 | | x | x | x | | |
| 5F | 2.20 | 4F/5F | 1.37 | | x | | x | | x |
| 6F | 1.58 | 5F/6F | 1.39 | x | | | | x | x |
| 7F | 1.37 | 6F/7F | 1.16 | x | x | | | x | |
| 8F | 1.00 | 7F/8F | 1.37 | x | x | x | | | |
| 9F | 0.73 | 8F/9F | 1.37 | x | x | | | | x |
| R1 | -6.37 | 1R/1F | 092 | x | | x | x | | |
| R2 | -4.66 | 1R/2R | 1.37 | x | | | x | | x |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.13 | 1F/9F | 8.86 |  |  | x | x |  | x |
| 2F | 5.00 | 1F/2F | 1.23 | x |  | x | x |  |  |
| 3F | 3.82 | 2F/3F | 1.31 |  | x | x | x |  |  |
| 4F | 2.78 | 3F/4F | 1.38 | x |  | x |  | x |  |
| 5F | 2.25 | 4F/5F | 1.23 |  | x | x |  | x |  |
| 6F | 1.87 | 5F/6F | 1.21 | x | x |  | x |  |  |
| 7F | 1.39 | 6F/7F | 1.35 | x | x |  |  | x |  |
| 8F | 1.00 | 7F/8F | 1.39 | x | x | x |  |  |  |
| 9F | 0.69 | 8F/9F | 1.44 |  | x | x |  |  | x |
| R1 | -8.32 | 1R/1F | 1.36 | x |  |  | x |  | x |
| R2 | -4.62 | 1R/2R | 1.80 | x |  |  |  | x | x |

| | Ratio | Step | Clutches | | | Brakes | | |
|---|---|---|---|---|---|---|---|---|
| | | | 68 | 70 | 72 | 62 | 64 | 66 |
| 1F | 6.39 | 1F/9F 8.95 | | | x | x | | x |
| 2F | 4.39 | 1F/2F 1.45 | | x | x | x | | |
| 3F | 3.34 | 2F/3F 1.32 | x | | x | x | | |
| 4F | 2.61 | 3F/4F 1.28 | | x | x | | x | |
| 5F | 2.12 | 4F/5F 1.24 | x | | x | | x | |
| 6F | 1.67 | 5F/6F 1.27 | x | x | | x | | |
| 7F | 1.32 | 6F/7F 1.27 | x | x | | | x | |
| 8F | 1.00 | 7F/8F 1.32 | x | x | x | | | |
| 9F | 0.72 | 8F/9F 1.40 | x | x | | | | x |
| R1 | -7.00 | 1R/1F 1.10 | | x | | x | | x |
| R2 | -4.17 | 1R/2R 1.68 | | x | | | x | x |

|    | Ratio | Step | Clutches | | | Brakes | | |
|----|-------|------|----|----|----|----|----|----|
|    |       |      | 68 | 70 | 72 | 62 | 64 | 66 |
| 1F | 5.90  | 1F/9F 8.17 |   |   | x | x |   | x |
| 2F | 5.00  | 1F/2F 1.18 | x |   | x | x |   |   |
| 3F | 3.86  | 2F/3F 1.29 |   | x | x | x |   |   |
| 4F | 2.75  | 3F/4F 1.40 |   |   | x |   | x | x |
| 5F | 2.33  | 4F/5F 1.18 | x |   | x |   | x |   |
| 6F | 1.80  | 5F/6F 1.30 | x | x |   | x |   |   |
| 7F | 1.27  | 6F/7F 1.42 | x | x |   |   | x |   |
| 8F | 1.00  | 7F/8F 1.27 | x | x | x |   |   |   |
| 9F | 0.72  | 8F/9F 1.38 |   | x | x |   |   | x |
| R1 | -9.12 | 1R/1F 1.55 | x |   |   | x |   | x |
| R2 | -4.25 | 1R/2R 2.14 | x |   |   |   | x | x |

| | Ratio | Step | | Clutches | | | Brakes | | |
|---|---|---|---|---|---|---|---|---|---|
| | | | | 68 | 70 | 72 | 62 | 64 | 66 |
| 1F | 6.62 | 1F/9F | 8.90 | | | | x | x | x |
| 2F | 4.78 | 1F/2F | 1.38 | | x | | x | x | |
| 3F | 4.11 | 2F/3F | 1.16 | | | x | x | x | |
| 4F | 3.29 | 3F/4F | 1.25 | | x | x | x | | |
| 5F | 2.45 | 4F/5F | 1.34 | | | x | x | | x |
| 6F | 1.41 | 5F/6F | 1.73 | x | | | | x | x |
| 7F | 1.25 | 6F/7F | 1.13 | x | | x | | x | |
| 8F | 1.00 | 7F/8F | 1.25 | x | x | x | | | |
| 9F | 0.74 | 8F/9F | 1.34 | x | | x | | | x |
| R1 | -5.92 | 1R/1F | 0.89 | x | x | | x | | |
| R2 | -4.41 | 1R/2R | 1.34 | x | | | x | | x |

|  | Ratio | Step | Clutches | | | Brakes | | |
|---|---|---|---|---|---|---|---|---|
|  |  |  | 68 | 70 | 72 | 62 | 64 | 66 |
| 1F | 6.35 | 1F/9F 9.07 |  |  |  | x | x | x |
| 2F | 4.31 | 1F/2F 1.47 |  | x |  | x | x |  |
| 3F | 3.68 | 2F/3F 1.17 |  |  | x | x | x |  |
| 4F | 2.85 | 3F/4F 1.29 |  | x | x | x |  |  |
| 5F | 1.99 | 4F/5F 1.43 |  |  | x | x |  | x |
| 6F | 1.52 | 5F/6F 1.31 | x |  |  |  | x | x |
| 7F | 1.29 | 6F/7F 1.17 | x |  | x |  | x |  |
| 8F | 1.00 | 7F/8F 1.29 | x | x | x |  |  |  |
| 9F | 0.70 | 8F/9F 1.43 | x |  | x |  |  | x |
| R1 | -5.74 | 1R/1F 0.95 | x | x |  |  | x |  |
| R2 | -4.02 | 1R/2R 1.43 | x |  |  |  | x | x |

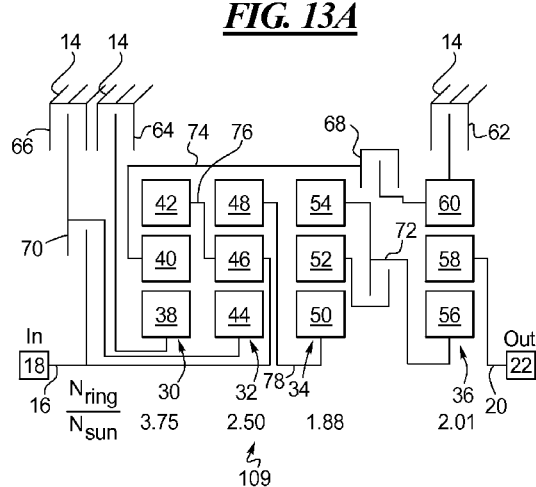

| | Ratio | Step | | Clutches | | | Brakes | | |
|---|---|---|---|---|---|---|---|---|---|
| | | | | 68 | 70 | 72 | 62 | 64 | 66 |
| 1F | 6.84 | 1F/9F | 9.01 | | | | x | x | x |
| 2F | 4.34 | 1F/2F | 1.47 | | x | | x | x | |
| 3F | 3.67 | 2F/3F | 1.18 | | | x | x | x | |
| 4F | 2.81 | 3F/4F | 1.31 | | x | x | x | | |
| 5F | 1.99 | 4F/5F | 1.41 | | | x | x | | x |
| 6F | 1.54 | 5F/6F | 1.29 | x | | | | x | x |
| 7F | 1.31 | 6F/7F | 1.18 | x | | x | | x | |
| 8F | 1.00 | 7F/8F | 1.31 | x | x | x | | | |
| 9F | 0.71 | 8F/9F | 1.41 | x | | x | | | x |
| R1 | -5.57 | 1R/1F | 0.87 | x | x | | | x | |
| R2 | -3.95 | 1R/2R | 1.41 | x | | | | x | x |

|  | Ratio | Step | Clutches | | | Brakes | | |
|---|---|---|---|---|---|---|---|---|
|  |  |  | 68 | 70 | 72 | 62 | 64 | 66 |
| 1F | 7.01 | 1F/9F 8.73 |  |  |  | x | x | x |
| 2F | 4.18 | 1F/2F 1.43 |  | x |  | x | x |  |
| 3F | 3.63 | 2F/3F 1.15 |  |  | x | x | x |  |
| 4F | 2.80 | 3F/4F 1.30 |  | x |  | x | x |  |
| 5F | 1.92 | 4F/5F 1.46 |  |  | x | x |  | x |
| 6F | 1.51 | 5F/6F 1.27 | x |  |  |  | x | x |
| 7F | 1.30 | 6F/7F 1.16 | x |  | x |  | x |  |
| 8F | 1.00 | 7F/8F 1.30 | x | x | x |  |  |  |
| 9F | 0.69 | 8F/9F 1.46 | x |  | x |  |  | x |
| R1 | -6.33 | 1R/1F 1.06 | x | x |  | x |  |  |
| R2 | -4.34 | 1R/2R 1.46 | x |  |  | x |  | x |

| | Ratio | Step | | Clutches | | | Brakes | |
|---|---|---|---|---|---|---|---|---|
| | | | 68 | 70 | 72 | 62 | 64 | 66 |
| 1F | 6.42 | 1F/9F 9.01 | | | | x | x | x |
| 2F | 4.58 | 1F/2F 1.40 | | x | | x | x | |
| 3F | 3.98 | 2F/3F 1.15 | | x | | x | x | |
| 4F | 3.12 | 3F/4F 1.27 | | x | | x | | |
| 5F | 2.22 | 4F/5F 1.40 | | | | x | x | x |
| 6F | 1.45 | 5F/6F 1.53 | x | | | | x | x |
| 7F | 1.28 | 6F/7F 1.14 | x | x | | | x | |
| 8F | 1.00 | 7F/8F 1.27 | x | x | x | | | |
| 9F | 0.71 | 8F/9F 1.40 | x | x | | | | x |
| R1 | -6.47 | 1R/1F 1.01 | x | x | | x | | |
| R2 | -4.61 | 1R/2R 1.40 | x | | | x | | x |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 7.01 | 1F/9F | 9.04 |  |  |  | x | x | x |
| 2F | 4.67 | 1F/2F | 1.48 |  | x |  | x | x |  |
| 3F | 3.61 | 2F/3F | 1.17 |  |  | x | x | x |  |
| 4F | 2.79 | 3F/4F | 1.29 |  | x | x | x |  |  |
| 5F | 2.16 | 4F/5F | 1.42 |  |  | x | x |  | x |
| 6F | 1.67 | 5F/6F | 1.31 | x |  |  |  | x | x |
| 7F | 1.29 | 6F/7F | 1.17 | x |  | x |  | x |  |
| 8F | 1.00 | 7F/8F | 1.29 | x | x | x |  |  |  |
| 9F | 0.77 | 8F/9F | 1.42 | x |  | x |  |  | x |
| R1 | -7.71 | 1R/1F | 0.88 | x | x |  | x |  |  |
| R2 | -4.97 | 1R/2R | 1.42 | x |  |  | x |  | x |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 5.28 | 1F/9F | 8.06 |  |  |  | x | x | x |
| 2F | 3.54 | 1F/2F | 1.49 |  | x |  | x | x |  |
| 3F | 2.89 | 2F/3F | 1.22 |  |  | x | x | x |  |
| 4F | 2.06 | 3F/4F | 1.41 | x |  |  |  | x | x |
| 5F | 1.72 | 4F/5F | 1.19 | x | x |  |  | x |  |
| 6F | 1.56 | 5F/6F | 1.11 | x |  | x |  | x |  |
| 7F | 1.22 | 6F/7F | 1.28 |  |  | x | x |  | x |
| 8F | 1.00 | 7F/8F | 1.22 | x | x | x |  |  |  |
| 9F | 0.65 | 8F/9F | 1.53 | x |  | x |  |  | x |
| R1 | -5.65 | 1R/1F | 1.07 | x | x |  | x |  |  |
| R2 | -3.70 | 1R/2R | 1.53 | x |  |  | x |  | x |

| | Ratio | Step | Clutches | | | Brakes | | |
|---|---|---|---|---|---|---|---|---|
| | | | 68 | 70 | 72 | 62 | 64 | 66 |
| 1F | 6.43 | 1F/9F 8.98 | | | | x | x | x |
| 2F | 4.41 | 1F/2F 1.46 | | | x | x | x | |
| 3F | 3.71 | 2F/3F 1.19 | | x | | x | x | |
| 4F | 2.81 | 3F/4F 1.32 | | x | x | x | | |
| 5F | 2.01 | 4F/5F 1.40 | | x | | x | | x |
| 6F | 1.55 | 5F/6F 1.30 | x | | | | x | x |
| 7F | 1.32 | 6F/7F 1.18 | x | x | | | x | |
| 8F | 1.00 | 7F/8F 1.32 | x | x | x | | | |
| 9F | 0.71 | 8F/9F 1.40 | x | x | | | | x |
| R1 | -5.60 | 1R/1F 0.87 | x | | x | x | | |
| R2 | -4.00 | 1R/2R 1.40 | x | | | x | | x |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.21 | 1F/9F | 9.03 |  |  |  | x | x | x |
| 2F | 4.27 | 1F/2F | 1.46 |  |  | x | x | x |  |
| 3F | 3.72 | 2F/3F | 1.15 |  | x |  | x | x |  |
| 4F | 2.93 | 3F/4F | 1.27 |  | x | x | x |  |  |
| 5F | 2.02 | 4F/5F | 1.45 |  | x |  | x |  | x |
| 6F | 1.47 | 5F/6F | 1.37 | x |  |  |  | x | x |
| 7F | 1.27 | 6F/7F | 1.16 | x | x |  |  | x |  |
| 8F | 1.00 | 7F/8F | 1.27 | x | x | x |  |  |  |
| 9F | 0.69 | 8F/9F | 1.45 | x | x |  |  |  | x |
| R1 | -6.20 | 1R/1F | 1.00 | x |  | x | x |  |  |
| R2 | -4.26 | 1R/2R | 1.45 | x |  |  | x |  | x |

| | Ratio | Step | | Clutches | | | Brakes | | |
|---|---|---|---|---|---|---|---|---|---|
| | | | | 68 | 70 | 72 | 62 | 64 | 66 |
| 1F | 5.27 | 1F/9F | 8.14 | | | | x | x | x |
| 2F | 3.51 | 1F/2F | 1.50 | | x | | x | x | |
| 3F | 2.88 | 2F/3F | 1.22 | | x | | x | x | |
| 4F | 2.06 | 3F/4F | 1.40 | x | | | | x | x |
| 5F | 1.72 | 4F/5F | 1.19 | x | | x | | x | |
| 6F | 1.56 | 5F/6F | 1.11 | x | x | | | x | |
| 7F | 1.20 | 6F/7F | 1.29 | | x | | x | | x |
| 8F | 1.00 | 7F/8F | 1.20 | x | x | x | | | |
| 9F | 0.65 | 8F/9F | 1.54 | x | x | | | | x |
| R1 | -5.72 | 1R/1F | 1.08 | x | | x | x | | |
| R2 | -3.71 | 1R/2R | 1.54 | x | | | x | | x |

| | Ratio | Step | | Clutches | | | Brakes | | |
| --- | --- | --- | --- | --- | --- | --- | --- | --- | --- |
| | | | | 68 | 70 | 72 | 62 | 64 | 66 |
| 1F | 5.67 | 1F/9F | 8.78 | | | | x | x | x |
| 2F | 3.51 | 1F/2F | 1.62 | | | x | x | x | |
| 3F | 2.84 | 2F/3F | 1.24 | | x | | x | x | |
| 4F | 2.07 | 3F/4F | 1.37 | x | | | | x | x |
| 5F | 1.69 | 4F/5F | 1.22 | x | | x | | x | |
| 6F | 1.52 | 5F/6F | 1.11 | x | x | | | x | |
| 7F | 1.21 | 6F/7F | 1.26 | | x | | x | | x |
| 8F | 1.00 | 7F/8F | 1.21 | x | x | x | | | |
| 9F | 0.64 | 8F/9F | 1.55 | x | x | | | | x |
| R1 | -5.07 | 1R/1F | 0.89 | x | | x | x | | |
| R2 | -3.27 | 1R/2R | 1.55 | x | | | x | | x |

|    | Ratio | Step  |      | Clutches |    |    | Brakes |    |    |
|----|-------|-------|------|----------|----|----|--------|----|----|
|    |       |       |      | 68 | 70 | 72 | 62 | 64 | 66 |
| 1F | 6.28  | 1F/9F | 8.83 |    |    |    | x  | x  | x  |
| 2F | 4.19  | 1F/2F | 1.49 |    |    | x  | x  | x  |    |
| 3F | 3.57  | 2F/3F | 1.18 |    | x  |    | x  | x  |    |
| 4F | 2.80  | 3F/4F | 1.27 |    | x  | x  | x  |    |    |
| 5F | 1.99  | 4F/5F | 1.41 |    | x  |    | x  |    | x  |
| 6F | 1.51  | 5F/6F | 1.32 | x  |    |    |    | x  | x  |
| 7F | 1.27  | 6F/7F | 1.18 | x  | x  |    |    | x  |    |
| 8F | 1.00  | 7F/8F | 1.27 | x  | x  | x  |    |    |    |
| 9F | 0.71  | 8F/9F | 1.41 | x  | x  |    |    |    | x  |
| R1 | -5.12 | 1R/1F | 0.81 | x  |    | x  | x  |    |    |
| R2 | -3.64 | 1R/2R | 1.41 | x  |    |    | x  |    | x  |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.21 | 1F/9F | 8.95 |  |  |  | x | x | x |
| 2F | 4.25 | 1F/2F | 1.46 |  |  | x | x | x |  |
| 3F | 3.65 | 2F/3F | 1.16 |  | x |  | x | x |  |
| 4F | 2.83 | 3F/4F | 1.29 |  | x | x | x |  |  |
| 5F | 1.96 | 4F/5F | 1.44 |  | x |  | x |  | x |
| 6F | 1.51 | 5F/6F | 1.30 | x |  |  |  | x | x |
| 7F | 1.29 | 6F/7F | 1.17 | x | x |  |  | x |  |
| 8F | 1.00 | 7F/8F | 1.29 | x | x | x |  |  |  |
| 9F | 0.69 | 8F/9F | 1.44 | x | x |  |  |  | x |
| R1 | -5.91 | 1R/1F | 0.95 | x |  |  | x | x |  |
| R2 | -4.10 | 1R/2R | 1.44 | x |  |  | x |  | x |

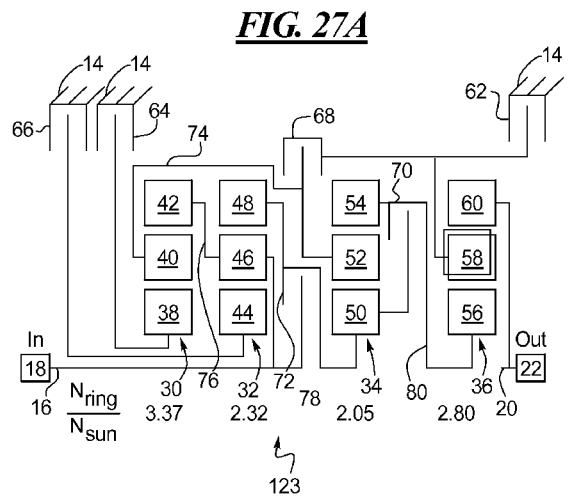

|    | Ratio | Step  |      | Clutches |    |    | Brakes |    |    |
|----|-------|-------|------|----------|----|----|--------|----|----|
|    |       |       |      | 68       | 70 | 72 | 62     | 64 | 66 |
| 1F | 5.35  | 1F/9F | 8.20 |          |    |    | x      | x  | x  |
| 2F | 3.53  | 1F/2F | 1.52 |          |    | x  | x      | x  |    |
| 3F | 2.87  | 2F/3F | 1.23 |          | x  |    | x      | x  |    |
| 4F | 2.08  | 3F/4F | 1.38 | x        |    |    |        | x  | x  |
| 5F | 1.73  | 4F/5F | 1.20 | x        |    | x  |        | x  |    |
| 6F | 1.56  | 5F/6F | 1.11 | x        | x  |    |        | x  |    |
| 7F | 1.20  | 6F/7F | 1.29 |          | x  |    | x      |    | x  |
| 8F | 1.00  | 7F/8F | 1.20 | x        | x  | x  |        |    |    |
| 9F | 0.65  | 8F/9F | 1.53 | x        | x  |    |        |    | x  |
| R1 | -5.51 | 1R/1F | 1.03 | x        |    | x  | x      |    |    |
| R2 | -3.60 | 1R/2R | 1.53 | x        |    |    | x      |    | x  |

| | Ratio | Step | Clutches | | | Brakes | | |
|---|---|---|---|---|---|---|---|---|
| | | | 68 | 70 | 72 | 62 | 64 | 66 |
| 1F | 6.47 | 1F/9F 8.84 | | | | x | x | x |
| 2F | 4.67 | 1F/2F 1.39 | | | x | x | x | |
| 3F | 3.99 | 2F/3F 1.17 | | x | | x | x | |
| 4F | 3.10 | 3F/4F 1.29 | | x | x | x | | |
| 5F | 2.27 | 4F/5F 1.36 | | x | | x | | x |
| 6F | 1.47 | 5F/6F 1.55 | x | | | | x | x |
| 7F | 1.29 | 6F/7F 1.14 | x | x | | | x | |
| 8F | 1.00 | 7F/8F 1.28 | x | x | x | | | |
| 9F | 0.73 | 8F/9F 1.36 | x | x | | | | x |
| R1 | -6.11 | 1R/1F 0.94 | x | | x | x | | |
| R2 | -4.47 | 1R/2R 1.36 | x | | | x | | x |

|  | Ratio | Step | | Clutches | | | Brakes | | |
|---|---|---|---|---|---|---|---|---|---|
|  |  |  | 68 | 70 | 72 | 62 | 64 | 66 |
| 1F | 6.55 | 1F/9F 9.40 |  |  |  | x | x | x |
| 2F | 4.46 | 1F/2F 1.47 |  |  | x | x | x |  |
| 3F | 3.83 | 2F/3F 1.16 |  | x |  | x | x |  |
| 4F | 2.97 | 3F/4F 1.29 |  | x | x | x |  |  |
| 5F | 2.07 | 4F/5F 1.43 |  | x |  | x |  | x |
| 6F | 1.50 | 5F/6F 1.38 | x |  |  |  | x | x |
| 7F | 1.29 | 6F/7F 1.16 | x | x |  |  | x |  |
| 8F | 1.00 | 7F/8F 1.29 | x | x | x |  |  |  |
| 9F | 0.70 | 8F/9F 1.43 | x | x |  |  |  | x |
| R1 | -6.06 | 1R/1F 0.93 | x |  | x | x |  |  |
| R2 | -4.22 | 1R/2R 1.43 | x |  |  | x |  | x |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.36 | 1F/9F | 8.89 |  | x |  | x |  | x |
| 2F | 4.95 | 1F/2F | 1.29 |  |  | x | x |  | x |
| 3F | 3.53 | 2F/3F | 1.40 |  | x | x | x |  |  |
| 4F | 2.52 | 3F/4F | 1.40 |  |  | x | x | x |  |
| 5F | 1.65 | 4F/5F | 1.53 | x |  |  |  | x | x |
| 6F | 1.49 | 5F/6F | 1.10 | x | x |  |  |  | x |
| 7F | 1.40 | 6F/7F | 1.07 | x |  | x |  |  | x |
| 8F | 1.00 | 7F/8F | 1.40 | x | x | x |  |  |  |
| 9F | 0.72 | 8F/9F | 1.40 | x |  | x |  | x |  |
| R1 | -6.36 | 1R/1F | 1.00 | x | x |  | x |  |  |
| R2 | -4.54 | 1R/2R | 1.40 | x |  |  | x |  | x |

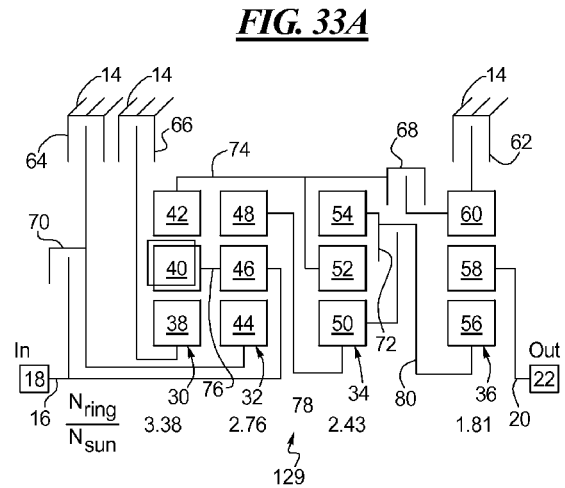
*FIG. 33A*  *FIG. 33B*

| | Ratio | Step | | Clutches | | | Brakes | | |
|---|---|---|---|---|---|---|---|---|---|
| | | | | 68 | 70 | 72 | 62 | 64 | 66 |
| 1F | 6.56 | 1F/9F | 8.89 | | | | x | x | x |
| 2F | 4.87 | 1F/2F | 1.35 | | x | | x | | x |
| 3F | 4.02 | 2F/3F | 1.21 | | | x | x | | x |
| 4F | 2.85 | 3F/4F | 1.41 | | x | x | x | | |
| 5F | 2.10 | 4F/5F | 1.35 | | | x | x | x | |
| 6F | 1.63 | 5F/6F | 1.29 | x | | | | x | x |
| 7F | 1.41 | 6F/7F | 1.16 | x | | x | | | x |
| 8F | 1.00 | 7F/8F | 1.41 | x | x | x | | | |
| 9F | 0.74 | 8F/9F | 1.35 | x | | x | | x | |
| R1 | -6.70 | 1R/1F | 1.02 | x | x | | x | | |
| R2 | -4.95 | 1R/2R | 1.35 | x | | | x | x | |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.49 | 1F/9F | 8.89 |  |  |  | x | x | x |
| 2F | 4.80 | 1F/2F | 1.35 |  | x |  | x |  | x |
| 3F | 3.99 | 2F/3F | 1.20 |  |  | x | x |  | x |
| 4F | 2.85 | 3F/4F | 1.40 |  | x | x | x |  |  |
| 5F | 2.08 | 4F/5F | 1.37 |  |  | x | x | x |  |
| 6F | 1.62 | 5F/6F | 1.29 | x |  |  |  | x | x |
| 7F | 1.40 | 6F/7F | 1.16 | x |  | x |  |  | x |
| 8F | 1.00 | 7F/8F | 1.40 | x | x | x |  |  |  |
| 9F | 0.73 | 8F/9F | 1.37 | x |  | x |  | x |  |
| R1 | -6.78 | 1R/1F | 1.04 | x | x |  | x |  |  |
| R2 | -4.95 | 1R/2R | 1.37 | x |  |  | x | x |  |

| | | | | Clutches | | | Brakes | | |
|---|---|---|---|---|---|---|---|---|---|
| | Ratio | Step | | 68 | 70 | 72 | 62 | 64 | 66 |
| 1F | 6.53 | 1F/9F | 9.00 | | | | x | x | x |
| 2F | 4.83 | 1F/2F | 1.35 | | | x | x | | x |
| 3F | 4.04 | 2F/3F | 1.19 | | x | | x | | x |
| 4F | 2.88 | 3F/4F | 1.41 | | x | x | x | | |
| 5F | 2.09 | 4F/5F | 1.38 | | x | | x | x | |
| 6F | 1.62 | 5F/6F | 1.29 | x | | | | x | x |
| 7F | 1.40 | 6F/7F | 1.15 | x | x | | | | x |
| 8F | 1.00 | 7F/8F | 1.40 | x | x | x | | | |
| 9F | 0.73 | 8F/9F | 1.38 | x | x | | | x | |
| R1 | -7.09 | 1R/1F | 1.09 | x | | x | x | | |
| R2 | -5.13 | 1R/2R | 1.38 | x | | | x | x | |

|  | Ratio | Step | Clutches | | | Brakes | | |
|---|---|---|---|---|---|---|---|---|
|  |  |  | 68 | 70 | 72 | 62 | 64 | 66 |
| 1F | 6.57 | 1F/9F 9.00 |  |  |  | x | x | x |
| 2F | 4.96 | 1F/2F 1.32 |  |  | x | x |  | x |
| 3F | 4.16 | 2F/3F 1.19 |  | x |  | x |  | x |
| 4F | 2.97 | 3F/4F 1.40 |  | x | x | x |  |  |
| 5F | 2.17 | 4F/5F 1.37 |  | x |  | x | x |  |
| 6F | 1.60 | 5F/6F 1.36 | x |  |  |  | x | x |
| 7F | 1.40 | 6F/7F 1.14 | x | x |  |  |  | x |
| 8F | 1.00 | 7F/8F 1.40 | x | x | x |  |  |  |
| 9F | 0.73 | 8F/9F 1.37 | x | x |  |  | x |  |
| R1 | -7.46 | 1R/1F 1.14 | x |  |  | x | x |  |
| R2 | -5.45 | 1R/2R 1.37 | x |  |  | x | x |  |

|  | Ratio | Step |  | Clutches | | | Brakes | | |
|---|---|---|---|---|---|---|---|---|---|
|  |  |  |  | 68 | 70 | 72 | 62 | 64 | 66 |
| 1F | 6.52 | 1F/9F | 9.02 |  |  |  | x | x | x |
| 2F | 4.88 | 1F/2F | 1.34 |  |  | x | x |  | x |
| 3F | 4.11 | 2F/3F | 1.19 |  | x |  | x |  | x |
| 4F | 2.94 | 3F/4F | 1.40 |  | x | x | x |  |  |
| 5F | 2.12 | 4F/5F | 1.38 |  | x |  | x | x |  |
| 6F | 1.60 | 5F/6F | 1.33 | x |  |  |  | x | x |
| 7F | 1.40 | 6F/7F | 1.14 | x | x |  |  |  | x |
| 8F | 1.00 | 7F/8F | 1.40 | x | x | x |  |  |  |
| 9F | 0.72 | 8F/9F | 1.39 | x | x |  |  | x |  |
| R1 | -7.45 | 1R/1F | 1.14 | x |  | x | x |  |  |
| R2 | -5.38 | 1R/2R | 1.38 | x |  |  | x | x |  |

MULTI-SPEED TRANSMISSION

CROSS-REFERENCE TO RELATED APPLICATION

This application claims the benefit of U.S. Provisional Application No. 61/264,480, filed on Nov. 25, 2009.

TECHNICAL FIELD

This disclosure is directed to automatic transmissions used in vehicles and machines, and more particularly to multi-speed planetary-type transmissions.

BACKGROUND

Machines such as, for example, off-highway trucks and other heavy construction and mining machines, are used to perform many tasks. To effectively perform these tasks, the machines require a power source that provides significant power to a transmission. The power source may be an engine such as, for example, a turbine engine, diesel engine, gasoline engine, or natural gas engine operated to generate a power output. The transmission may provide a range of gearing in order to allow the machine to work at several different speeds while keeping the engine within a desired operating range. Typically, the machines include a multi-speed transmission that generally includes a series of gears and is connected to the engine via a torque converter. The torque converter may assist with initial start-up and further may provide a broader torque transmission range.

As described in U.S. Pat. No. 5,924,951 to Winzeler et al., a multi-speed transmission for a machine typically includes a variety of gears and clutches that are disposed between an input member and an output member of a machine. The input member is connected to, and is rotated by, an engine via a torque converter. The output member is used to move the machine. The clutches are used to engage different combinations of gears that will connect the input member to the output member through a selected gear ratio. The selected gear ratio translates the rotational speed of the input member, as provided by the engine, to a desired rotational speed of the output member.

To generate the wide range of gear ratios for the machine, the multi-speed transmission typically includes a plurality of intermeshing gears and a corresponding plurality of control elements such as clutches and brakes. Each of the gears may have different numbers of teeth to achieve the desired gear ratios. In addition, differently designed clutches may be used to engage the different gears.

The manner in which the gears are engaged to provide the different gear ratios and the number of different gear ratios impacts the efficiency of the transmission and machine. The larger the step and the more variable the step between gear ratios, the more an engine will deviate from the desired operating range. Energy and efficiency are lost when the machine operates outside of the desired operating range.

More recently, some multi-speed transmissions have been proposed which provide a greater number of forward gear ratios. U.S. Pat. No. 7,575,533 to Gumpoltsberger, for example, discloses a multi-speed transmission having four planetary gear sets, three clutches, and three brakes. The transmission provides nine forward gear ratios and one reverse gear ratio. It may be advantageous is certain applications, however, to provide more than one reverse gear ratio.

Other transmissions have been proposed that provide a greater number of forward gear ratios as well as multiple reverse gear ratios. These devices, however, require an excessive number of gears and/or control elements (such as clutches and brakes). U.S. Patent Application Publication No. 2009/0036252 to Phillips et al., for example, discloses multi-speed transmissions having nine forward gear ratios and up to five reverse gear ratios. Each of the embodiments disclosed in Phillips has 4 planetary gears (including one double pinion planetary gear) and nine control elements in the form of clutches and/or brakes. The excessive number of clutches and brakes make the transmission overly costly to manufacture and assemble. Additionally, these numerous components may generate unnecessary drag between rotating and non-rotating components, which adversely affects fuel efficiency.

The exemplary embodiments disclosed herein of a multi-speed transmission overcome one or more of the performance, fuel economy, and cost issues set forth above. While the embodiments are described in the context of a truck, one skilled in the art will appreciate that this disclosure is clearly applicable to other types of vehicles and machines that require operation in multiple forward and reverse speeds.

SUMMARY OF THE DISCLOSURE

A multi-speed transmission may include an input member and an output member disposed in housing. A first planetary gear set, a second planetary gear set, a third planetary gear set, and a fourth planetary gear set may be disposed in the housing, each planetary gear set including a sun gear, a planet carrier, and a ring gear. Six control elements may be operably coupled to the planetary gear sets and selectively engageable to create a set of different gear ratios between the input member and the output member, the set of different gear ratios including at least nine forward gear ratios and at least two reverse gear ratios. The input member may be operatively connected to one of the planet carrier of the first planetary gear set and the planet carrier of the second planetary gear set.

A multi-speed transmission may include an input member and an output member disposed in a housing. A first planetary gear set, a second planetary gear set, a third planetary gear set, and a fourth planetary gear set may be disposed in the housing, each planetary gear set including a sun gear, a planet carrier, and a ring gear. No more than six control elements may be operably coupled to the planetary gear sets and selectively engageable to create a set of different gear ratios between the input member and the output member, the set of different gear ratios including at least nine forward gear ratios and at least two reverse gear ratios.

BRIEF DESCRIPTION OF THE DRAWINGS

FIG. 2 is a schematic illustration of a transmission in accordance with one embodiment of the present disclosure.

FIG. 3 is a chart identifying the engaged control elements, ratio reductions, and step percents for each gear provided by the transmission of FIG. 2.

FIG. 13A is a schematic of a transmission in accordance with an additional embodiment of the present disclosure.

FIG. 13B is a chart identifying the engaged control elements, ratio reductions, and step percents for each gear provided by the transmission of FIG. 13A.

FIG. 27A is a schematic of a transmission in accordance with an additional embodiment of the present disclosure.

FIG. 27B is a chart identifying the engaged control elements, ratio reductions, and step percents for each gear provided by the transmission of FIG. 27A.

FIG. 33A is a schematic of a transmission in accordance with an additional embodiment of the present disclosure.

FIG. 33B is a chart identifying the engaged control elements, ratio reductions, and step percents for each gear provided by the transmission of FIG. 33A.

DETAILED DESCRIPTION

Figure 1:
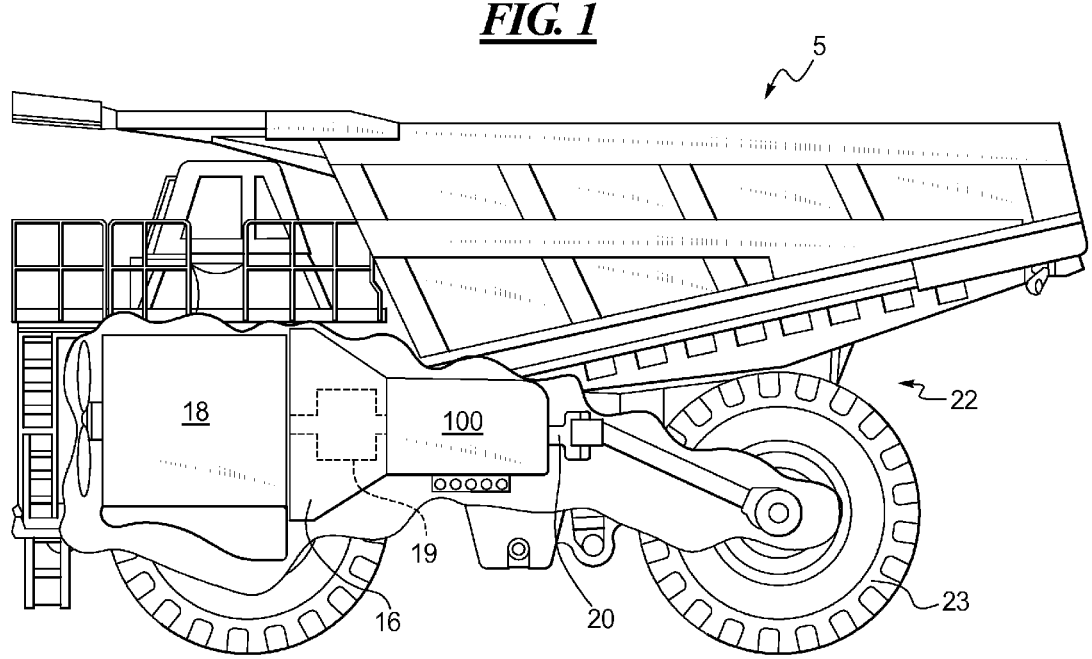
FIG. 1 is a diagrammatic illustration of a machine in accordance with one embodiment of the present disclosure.

FIG. 1 illustrates an exemplary machine 5. Machine 5 may embody a mobile machine that performs an operation associated with industry, such as mining, construction, farming, transportation, or any other industry known in the art. For example, machine 5 may be an earth moving machine such as an off-highway haul truck, a loader, a motor grader, or any other earth moving machine. Machine 5 may alternatively embody an on-highway vocational truck or passenger vehicle, or any other suitable operation-performing machine. Machine 5 may include a power source 18, a transmission 100, and a traction device 22. An input member 16 may operably connect the power source 18 to the transmission 100, while an output member 20 may operably connect the transmission 100 to the traction device 22.

The power source 18 may be configured to produce a power output and may include an internal combustion engine such as, for example, a heavy fuel engine, a diesel engine, a gasoline engine, a gaseous fuel engine, or any other apparent type of engine. It is contemplated that the power source 18 may alternatively include another source of power such as a battery, a fuel cell, or any other source of power known in the art.

The input member 16 may include a torque converter 19, such as a hydro-mechanical device configured to couple the power source 18 to the transmission 100. For example, the torque converter 19 may conduct pressurized fluid between the output of the power source 18 and the input of the transmission 100 thereby to drive the transmission 100, while still allowing the power source 18 to rotate somewhat independently of the transmission 100. In this arrangement, the torque converter 19 may selectively absorb and multiply the torque transferred between the power source 18 and the transmission 100 by either allowing or preventing slippage between the output rotation of the power source 18 and the input rotation of the transmission 100. It is contemplated that the torque converter 19 may alternatively embody a non-hydraulic device such as, for example, a mechanical diaphragm clutch. It should be noted, however, that the use of a torque converter is not required and that alternative embodiments omit this component, such as when a master clutch or a clutch and an electric motor (as may be used for hybrid configurations) are provided.

The fraction device 22 may include wheels 23 located to each side of the machine 5 (only one side shown). Alternatively, the traction device 22 may include tracks, belts, or other driven traction devices. The wheels 23 may be driven by the transmission 100 to rotate in accordance with an output rotation of the transmission 100.

FIG. 2 schematically illustrates the transmission 100 on one side of a rotational axis 12. The transmission 100 may include a stationary housing 14. Four planetary gear sets may be rotatably supported and aligned along the rotational axis 12 and disposed within the housing 14. The transmission 100 may further include a plurality of control elements, such as clutches and brakes, configured to selectively engage the housing 14, planetary gear sets, or other transmission components such as shafts. The structure of the gears, control elements, input members, output members, coupling members, and the connections therebetween may be achieved using conventional components.

As will be explained in more detail in connection with the embodiments of this disclosure, a planetary gear set may include at least one sun gear, at least one planet carrier including a plurality of planet gears, and a ring gear. In a simple or single orbit planetary gear set having single set of planet gears, the planet gears of the planet carrier mesh with the sun gear and the ring gear. A double pinion or double orbit planetary gear set has a first or inner set of planet gears and a second or outer set of planet gears, and therefore the inner planet gears mesh with the sun gear and the outer planet gears, while the outer planet gears mesh with the inner planet gears and the ring gear. As used herein, the term "planetary gear set" includes single orbit, double orbit, or other known types of planetary gear sets.

The sun gear, planet carrier, planet gears, and ring gear may all rotate together simultaneously. Alternately, each of the sun gear, planet carrier, and ring gear may be held stationary. The planetary gear set receives an input rotation at a first speed and generates a corresponding output rotation at a second speed. The change in rotational speed between the input and the output depends upon the number of teeth in the sun gear, the plurality of planet gears (if multiple planet gear sets) mounted to the planet carrier, and the ring gear. The change in rotational speed also depends upon the gear that is used to receive the input rotation, the gear that is selected to provide the output rotation, and which gear, if any, is held stationary.

The multi-speed transmission 100 illustrated in FIG. 2 includes a first planetary gear set 30, a second planetary gear set 32, a third planetary gear set 34, and a fourth planetary gear set 36 which are arranged in sequential order in an axial direction or the direction of power flow. Each planetary gear set includes at least one sun gear, at least one planet carrier, and at least one ring gear. Accordingly, the first planetary gear set 30 has a sun gear 38, a planet carrier 40, and a ring gear 42. The second planetary gear set 32 has a sun gear 44, a planet carrier 46, and a ring gear 48. The third planetary gear set 34 includes a sun gear 50, a planet carrier 52, and a ring gear 54. Finally, the fourth planetary gear set 36 includes a sun gear 56, a planet carrier 58, and a ring gear 60.

The transmission 100 may also include six control elements operatively coupled to the planetary gear sets and selectively engageable to create a set of different gear ratios between the input member 16 and the output member 20. As used herein, the term "control element" includes clutches (which are alternatively referred to in the industry as rotational clutches), brakes (which are alternatively referred to in the industry as stationary clutches), synchronizers (including dog and other types of synchronizing clutches) or other torque control components that may conventionally be used in a transmission. In the embodiment of FIG. 2, the transmission 100 includes a first brake 62, a second brake 64, and a third brake 66 having components thereof connected to the stationary housing 14. Additionally, the transmission 100 includes a first clutch 68, a second clutch 70, and a third clutch 72, each of which is connected between rotatable components of the transmission 100.

The transmission 100 may further include a plurality of intermediate coupling members connecting the components of the planetary gear sets to control elements or components of other planetary gear sets. As illustrated in FIG. 2, the transmission 100 includes a first intermediate coupling member 74, a second intermediate coupling member 76, a third intermediate coupling member 78, a fourth intermediate coupling member 80, a fifth intermediate coupling member 82, a sixth intermediate coupling member 84, and a seventh intermediate coupling member 86.

The components of the transmission 100 may be connected to obtain nine forward and two reverse gear ratios. As best shown in FIG. 2, the input member 16 is operatively connected to the planet carrier 40 of the first planetary gear set 30. The first intermediate coupling member 74 is connected to the sun gear 38, connected to the housing 14 via the third brake 66, and selectively connected to the third intermediate coupling member 78 by the first clutch 68. The second intermediate coupling member 76 is connected to the planet carrier 40 and selectively connected to the third intermediate coupling member 78 via the third clutch 72. The third intermediate coupling member 78 is selectively connected to the first intermediate coupling 74 via the first clutch 68, selectively connected to the second intermediate coupling 76 via the third clutch 72, and connected to the planet carrier 46. The fourth intermediate coupling member 80 is connected to the ring gear 42, connected to the sun gear 44, and selectively connected to the output member 20 via the second clutch 70. The fifth intermediate coupling 82 is connected to the ring gear 48 and the sun gear 50. The sixth intermediate coupling 84 is connected to the sun gear 50 and the sun gear 56. The seventh intermediate coupling 86 is connected to the planet carrier 52 and the ring gear 60. The ring gear 54 is selectively connected to the housing 14 via the second brake 64, and the ring gear 60 is selectively connected to the housing 14 via the first brake 62. The output member 20 is further connected to the planet carrier 58.

FIG. 3 discloses a truth table 150 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36. In this embodiment, the planetary gear sets 30, 32, 34, and 36 are configured to have a ring-to-sun gear ratio $N_{ring}/N_{sun}$ of 2.27, 1.80, 1.80, and 3.70, respectively, to obtain the forward and reverse speed ratios noted in the truth table. The ring-to-sun gear ratios $N_{ring}/N_{sun}$ are exemplary, as components of the transmission may be modified to achieve different ratios.

Another embodiment of a multi-speed transmission 101 is illustrated in FIG. 4, again shown on one side of the rotational axis 12. The transmission 101 includes the stationary housing 14. Four planetary gear sets are rotatably supported and aligned along the rotational axis 12 and disposed within the housing 14. The transmission 101 may further include a plurality of control elements, such as clutches and brakes, configured to selectively engage the housing 14, planetary gear sets, or other transmission components such as shafts. The structure of the gears, control elements, input members, output members, coupling members, and the connections therebetween may be achieved using conventional components.

Figure 4:
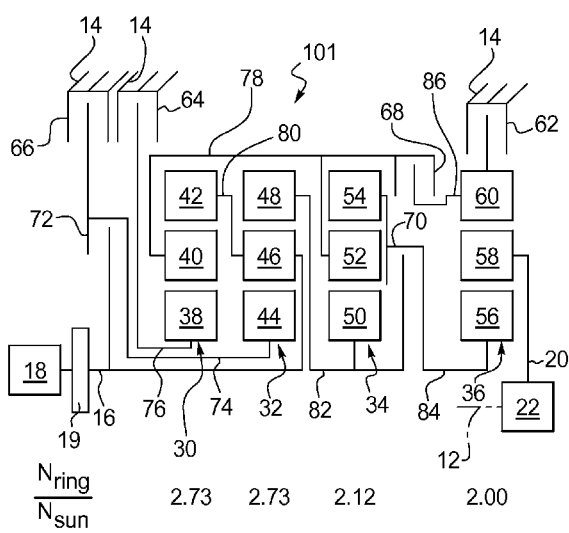
FIG. 4 is a schematic of a transmission in accordance with a second embodiment of the present disclosure.

More specifically, the multi-speed transmission 101 illustrated in FIG. 4 includes the four planetary gear sets 30, 32, 34, and 36 arranged in sequential order in an axial direction or the direction of power flow. Accordingly, the first planetary gear set 30 has a sun gear 38, a planet carrier 40, and a ring gear 42. The second planetary gear set 32 includes a sun gear 44, a planet carrier 46, and a ring gear 48. The third planetary gear set 34 has a sun gear 50, a planet carrier 52, and a ring gear 54. Finally, the fourth planetary gear set 36 includes a sun gear 56, a planet carrier 58, and a ring gear 60.

The transmission 101 may also include six control elements operatively coupled to the planetary gear sets and selectively engageable to create a set of different gear ratios between the input member 16 and the output member 20. In the embodiment of FIG. 4, the transmission 101 includes the first brake 62, the second brake 64, and the third brake 66 having components thereof connected to the stationary housing 14. Additionally, the transmission 101 includes a first clutch 68, a second clutch 70, and a third clutch 72, each of which is connected between rotatable components of the transmission 101.

The transmission 101 may further include a plurality of intermediate coupling members connecting the components of the planetary gear sets to control elements or components of other planetary gear sets. As illustrated in FIG. 4, the transmission 101 has a first intermediate coupling member 74, a second intermediate coupling member 76, a third intermediate coupling member 78, a fourth intermediate coupling member 80, a fifth intermediate coupling member 82, a sixth intermediate coupling member 84, and a seventh intermediate coupling member 86.

The components of the transmission 101 may be connected to obtain at least nine forward and two reverse gear ratios. As best shown in FIG. 4, the input member 16 is operatively connected to the planet carrier 46 of the second planetary gear set 32. The input member 16 is further selectively connected to the sun gear 44 via the third clutch 72 and the first intermediate coupling member 74. The second intermediate coupling member 76 is connected to the sun gear 38 and selectively connected to the housing 14 via the second brake 64. The sun gear 44 is selectively coupled to the housing by the third brake 66. The third intermediate coupling member 78 is connected to the planet carrier 40, connected to the planet carrier 52, and selectively connected to the ring gear 60 via the first clutch 68 and seventh intermediate coupling member 86. The fourth intermediate coupling member 80 is connected to the ring gear 42 and the planet carrier 46. The fifth intermediate coupling 82 is connected to the ring gear 48 and the sun gear 50. The fifth intermediate coupling 82 is further selectively coupled to both the ring gear 54 and the sun gear 56 via the second clutch 70 and sixth intermediate coupling member 84. The ring gear 60 is selectively connected to the housing 14 via the first brake 62. The output member 20 is further connected to the planet carrier 58.

Figure 5:
FIG. 5 is a chart identifying the engaged control elements, ratio reductions, and step percents for each gear provided by the transmission of FIG. 4.

FIG. 5 discloses a truth table 151 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 101 shown in FIG. 4. In this embodiment, the planetary gear sets 30, 32, 34, and 36 are configured to have a ring-to-sun gear ratio $N_{ring}/N_{sun}$ of 2.27, 1.80, 1.80, and 3.70, respectively, to obtain the forward and reverse speed ratios noted in the truth table. The ring-to-sun gear ratios $N_{ring}/N_{sun}$ are exemplary, as components of the transmission may be modified to achieve different ratios.

Figures 6A, 6B:
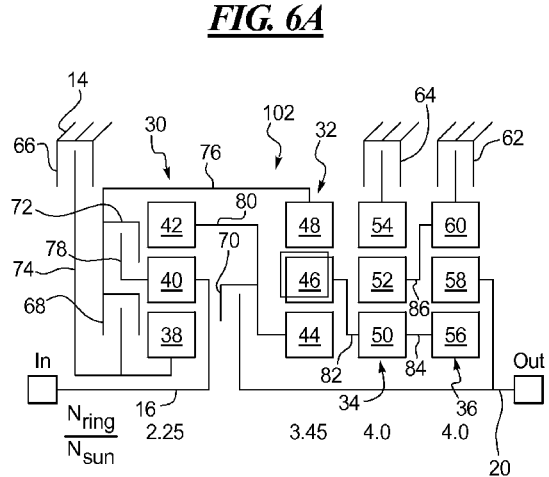
FIG. 6A is a schematic of a transmission in accordance with an additional embodiment of the present disclosure.
FIG. 6B is a chart identifying the engaged control elements, ratio reductions, and step percents for each gear provided by the transmission of FIG. 6A.

FIGS. 6A and 6B illustrate a further embodiment of a transmission 102 having nine forward and two reverse gears. FIG. 6A schematically illustrates the transmission 102 having an input member 16, output member 20, a first planetary gear set 30, a second planetary gear set 32, a third planetary gear set 34, and a fourth planetary gear set 36. The first planetary gear set 30 includes a sun gear 38, a planet carrier 40, and a ring gear 42. The second planetary 32 gear set includes a sun gear 44, a planet carrier 46 (which is a double orbit carrier holding an inner set of planet gears and an outer set of planet gears), and a ring gear 48. The third planetary gear set 34 includes a sun gear 50, a planet carrier 52, and a ring gear 54. The fourth planetary gear set 36 includes a sun gear 56, a planet carrier 58, and a ring gear 60. The transmission further includes a first brake 62, a second brake 64, and a third brake 66, as well as a first clutch 68, a second clutch 70, and a third clutch 72.

FIG. 6A schematically illustrates the various connections between the gear components and control elements, including the input member 16 being operatively coupled to the planet carrier 40 of the first planetary gear set 30. A first intermediate coupling member 74 is connected to the sun gear 38 and selectively connected to the housing 14 by the third brake 66. The first intermediate coupling member 74 is also selectively coupled to a second intermediate coupling member 76 by the first clutch 68 and to a third intermediate coupling member 78 by the first and third clutches 68, 72. The second intermediate coupling member 76 is connected to the ring gear 48, while the third intermediate coupling member 78 is connected to the planet carrier 40. The ring gear 42 is connected to the sun gear 44 by a fourth intermediate coupling member 80, which is selectively coupled to the output member 20 by the second clutch 70. A fifth intermediate coupling 82 connects the planet carrier 46 to the sun gear 50. A sixth intermediate coupling 84 connects the sun gear 50 to the sun gear 56. A seventh intermediate coupling 86 connects the planet carrier 52 to the ring gear 60. The ring gear 54 is selectively coupled to the housing 14 by an eighth intermediate coupling 88 and the second brake 64. The ring gear 60 is selectively coupled to the housing 14 by a ninth intermediate coupling 90 and the first brake 62. The planet carrier 58 is connected to the output member 20.

FIG. 6B discloses a truth table 152 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 102 shown in FIG. 6A. In this embodiment, the planetary gear sets 30, 32, 34, and 36 are configured to have a ring-to-sun gear ratio $N_{ring}/N_{sun}$ of 2.25, 3.45, 4.0, and 4.0, respectively, to obtain the forward and reverse speed ratios noted in the truth table. The ring-to-sun gear ratios $N_{ring}/N_{sun}$ are exemplary, as components of the transmission may be modified to achieve different ratios.

FIGS. 7A-38A illustrate additional embodiments of transmissions having nine forward and two reverse gears. The schematic illustrations follow the same convention as in the foregoing embodiments, with the components of each planetary gear aligned vertically and including a sun gear, a planet carrier (which may be a single or double orbit carrier, depending on how many boxes are shown for that component), and a ring gear. The same schematic representations for clutches and brakes are also provided, and the connections between each component are shown with solid lines. Both the input to the transmission and the output from the transmission are schematically shown.

Figures 7A, 7B:
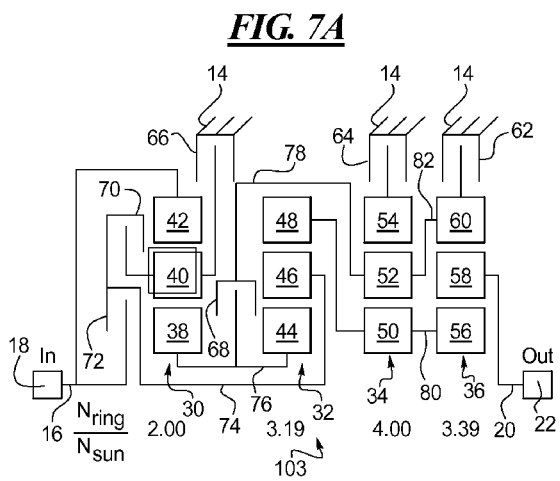
FIG. 7A is a schematic of a transmission in accordance with an additional embodiment of the present disclosure.
FIG. 7B is a chart identifying the engaged control elements, ratio reductions, and step percents for each gear provided by the transmission of FIG. 7A.

FIG. 7A schematically illustrates a transmission 103 and the various connections between the gear components and control elements, including the input member 16 being operatively coupled to the ring gear 42. The input member 16 is also selectively coupled to a first intermediate coupling member 74 by the second clutch 70. The first intermediate coupling member 74 is operatively connected to the planet carrier 46. The third clutch 72 selectively couples the planet carrier 40 to the first intermediate coupling member 74. The planet carrier 40 is also selectively coupled to the housing 14 by the third brake 66. A second intermediate coupling member 76 connects the sun gear 38 to the sun gear 44. The second intermediate coupling member 76 is also selectively coupled to a third intermediate coupling member 78 by the first clutch 68. The third intermediate coupling 78 is operatively connected to the planet carrier 52. A fourth intermediate coupling member 80 operatively connects the sun gear 50 to the sun gear 56, and a fifth intermediate coupling member 82 operatively connects the planet carrier 52 to the ring gear 60. The ring gear 54 is selectively coupled to the housing 14 by the second brake 64 and the ring gear 60 is selectively coupled to the housing 14 by the first brake 62. The planet carrier 58 is coupled to the output member 20.

FIG. 7B discloses a truth table 153 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 103 shown in FIG. 7A. In this embodiment, the planetary gear sets 30, 32, 34, and 36 are configured to have a ring-to-sun gear ratio $N_{ring}/N_{sun}$ of 2.00, 3.19, 4.00, and 3.39, respectively, to obtain the forward and reverse speed ratios noted in the truth table. The ring-to-sun gear ratios $N_{ring}/N_{sun}$ are exemplary, as components of the transmission may be modified to achieve different ratios.

Figures 8A, 8B:
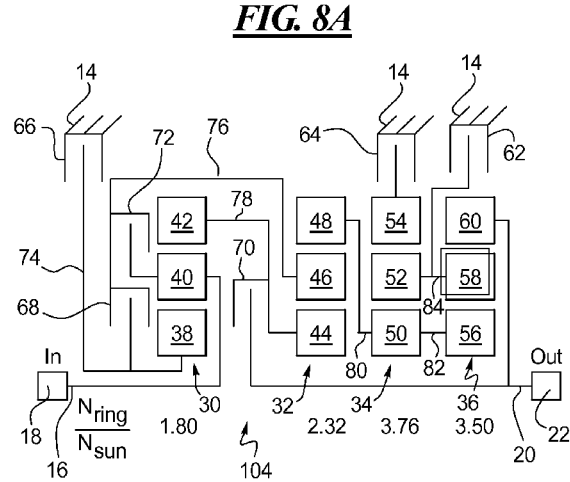
FIG. 8A is a schematic of a transmission in accordance with an additional embodiment of the present disclosure.
FIG. 8B is a chart identifying the engaged control elements, ratio reductions, and step percents for each gear provided by the transmission of FIG. 8A.

FIG. 8A schematically illustrates a transmission 104 and the various connections between the gear components and control elements, including the input member 16 being operatively coupled to the planet carrier 40. A first intermediate coupling member 74 selectively couples the sun gear 38 to the housing 14 via the third brake 66. The first intermediate coupling member 74 is also selectively coupled to the planet carrier 40 by the first and third clutches 68, 72, and to a second intermediate coupling member 76 by the first clutch 68. The second intermediate coupling member 76 is also operatively connected to the planet carrier 46. A third intermediate coupling member 78 operatively connects the ring gear 42 to the sun gear 44. The third intermediate coupling member 78 is selectively coupled to the output member 20 by the second clutch 70. A fourth intermediate coupling member 80 operatively connects the ring gear 48 to the sun gear 50, while a fifth intermediate coupling member 82 operatively connects the sun gear 50 to the sun gear 56. A sixth intermediate coupling member 84 operatively connects the planet carrier 52 to the planet carrier 58 (which in this embodiment is a double orbit carrier having an inner set of planet gears and an outer set of planet gears). The sixth intermediate coupling 84 is also selectively coupled to the housing 14 by the first brake 62. The ring gear 54 is selectively coupled to the housing by the second brake 64, and the ring gear 60 is operatively connected to the output member 20.

FIG. 8B discloses a truth table 154 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 104 shown in FIG. 8A. In this embodiment, the planetary gear sets 30, 32, 34, and 36 are configured to have a ring-to-sun gear ratio $N_{ring}/N_{sun}$ of 1.80, 2.32, 3.76, and 3.50, respectively, to obtain the forward and reverse speed ratios noted in the truth table. The ring-to-sun gear ratios $N_{ring}/N_{sun}$ are exemplary, as components of the transmission may be modified to achieve different ratios.

Figures 9A, 9B:
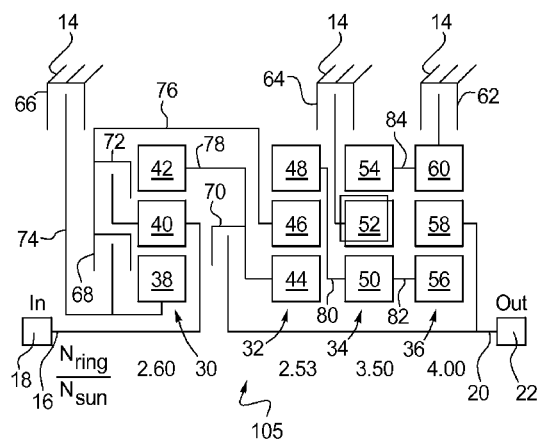
FIG. 9A is a schematic of a transmission in accordance with an additional embodiment of the present disclosure.
FIG. 9B is a chart identifying the engaged control elements, ratio reductions, and step percents for each gear provided by the transmission of FIG. 9A.

FIG. 9A schematically illustrates a transmission 105 and the various connections between the gear components and control elements, including the input member 16 being operatively coupled to the planet carrier 40. A first intermediate coupling member 74 selectively couples the sun gear 38 to the housing 14 via the third brake 66. The first intermediate coupling member 74 is also selectively coupled to the planet carrier 40 by the first and third clutches 68, 72, and to a second intermediate coupling member 76 by the first clutch 68. The second intermediate coupling member 76 is also operatively connected to the planet carrier 46. A third intermediate coupling member 78 operatively connects the ring gear 42 to the sun gear 44. The third intermediate coupling member 78 is selectively coupled to the output member 20 by the second clutch 70. A fourth intermediate coupling member 80 operatively connects the ring gear 48 to the sun gear 50, while a fifth intermediate coupling member 82 operatively connects the sun gear 50 to the sun gear 56. A sixth intermediate coupling member 84 operatively connects the ring gear 54 to the ring gear 60. The planet carrier 52 (which in this embodiment is a double orbit carrier having an inner set of planet gears and an outer set of planet gears) is selectively coupled to the housing 14 by the second brake 64, while the ring gear 60 is selectively coupled to the housing 14 by the first brake 62. The planet carrier 58 is operatively connected to the output member 20.

FIG. 9B discloses a truth table 155 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 105 shown in FIG. 9A. In this embodiment, the planetary gear sets 30, 32, 34, and 36 are configured to have a ring-to-sun gear ratio $N_{ring}/N_{sun}$ of 2.60, 2.53, 3.50, and 4.00, respectively, to obtain the forward and reverse speed ratios noted in the truth table. The ring-to-sun gear ratios $N_{ring}/N_{sun}$ are exemplary, as components of the transmission may be modified to achieve different ratios.

Figures 10A, 10B:
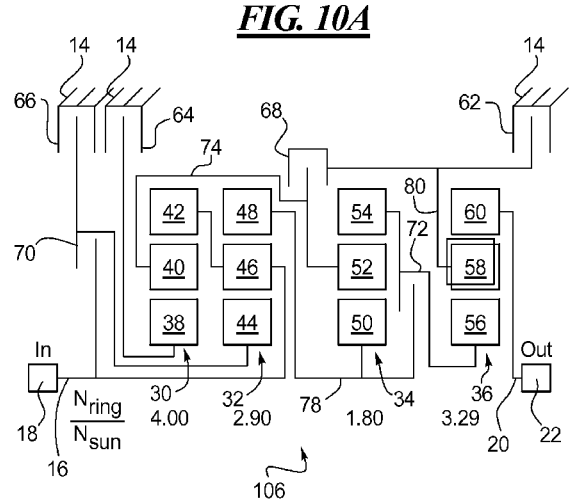
FIG. 10A is a schematic of a transmission in accordance with an additional embodiment of the present disclosure.
FIG. 10B is a chart identifying the engaged control elements, ratio reductions, and step percents for each gear provided by the transmission of FIG. 10A.

FIG. 10A schematically illustrates a transmission 106 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the planet carrier 52. A second intermediate coupling member 76 operatively connects the ring gear 42 to the planet carrier 46. A third intermediate coupling member 78 operatively connects the ring gear 48 to the sun gear 50. The third intermediate coupling member 78 is selectively coupled to the ring gear 54 and sun gear 56 by the third clutch 72. A fourth intermediate coupling member 80 is operatively connected to the planet carrier 58 (which in this embodiment is a double orbit carrier having an inner set of planet gears and an outer set of planet gears) and is selectively coupled to the housing 14 by the first brake 62. The fourth intermediate coupling member 80 is further selectively coupled to the first intermediate coupling member 74 by the first clutch 68. The ring gear 60 is operatively connected to the output member 20.

FIG. 10B discloses a truth table 156 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 106 shown in FIG. 10A. In this embodiment, the planetary gear sets 30, 32, 34, and 36 are configured to have a ring-to-sun gear ratio $N_{ring}/N_{sun}$ of 4.00, 2.90, 1.80, and 3.29, respectively, to obtain the forward and reverse speed ratios noted in the truth table. The ring-to-sun gear ratios $N_{ring}/N_{sun}$ are exemplary, as components of the transmission may be modified to achieve different ratios.

Figures 11A, 11B:
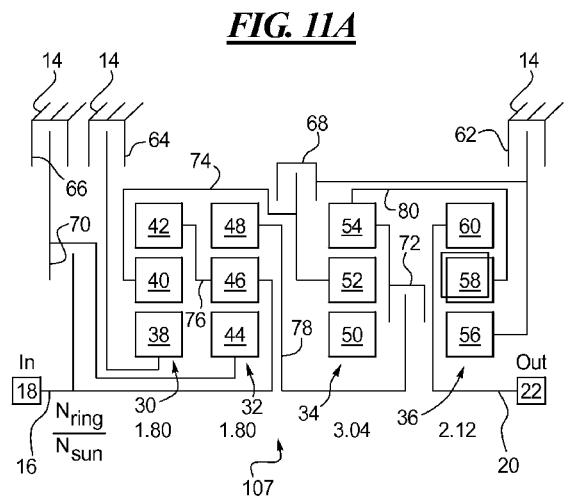
FIG. 11A is a schematic of a transmission in accordance with an additional embodiment of the present disclosure.
FIG. 11B is a chart identifying the engaged control elements, ratio reductions, and step percents for each gear provided by the transmission of FIG. 11A.

FIG. 11A schematically illustrates a transmission 107 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the planet carrier 52. A second intermediate coupling member 76 operatively connects the ring gear 42 to the planet carrier 46. A third intermediate coupling member 78 operatively connects the ring gear 48 to the sun gear 50. The third intermediate coupling member 78 is selectively coupled to the ring gear 54 by the third clutch 72. A fourth intermediate coupling member 80 operatively connects the ring gear 54 to the planet carrier 58 (which in this embodiment is a double orbit carrier having an inner set of planet gears and an outer set of planet gears). The sun gear 56 is selectively coupled to the housing 14 by the first brake 62. The sun gear 56 is also selectively coupled to the first intermediate coupling member 74 by the first clutch 68. The ring gear 60 is connected to the output member 20.

FIG. 11B discloses a truth table 157 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 107 shown in FIG. 11A. In this embodiment, the planetary gear sets 30, 32, 34, and 36 are configured to have a ring-to-sun gear ratio $N_{ring}/N_{sun}$ of 1.80, 1.80, 3.04, and 2.12, respectively, to obtain the forward and reverse speed ratios noted in the truth table. The ring-to-sun gear ratios $N_{ring}/N_{sun}$ are exemplary, as components of the transmission may be modified to achieve different ratios.

Figures 12A, 12B:
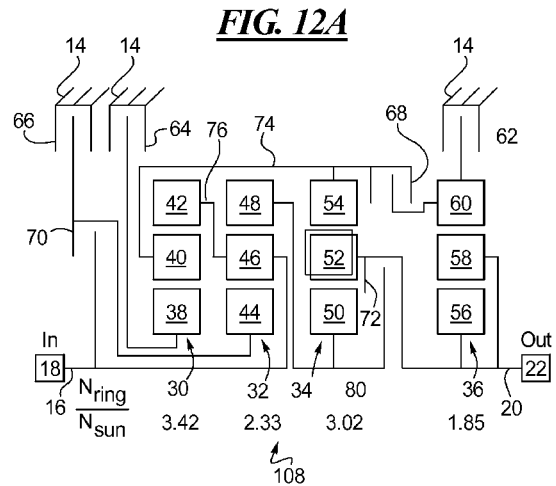
FIG. 12A is a schematic of a transmission in accordance with an additional embodiment of the present disclosure.
FIG. 12B is a chart identifying the engaged control elements, ratio reductions, and step percents for each gear provided by the transmission of FIG. 12A.

FIG. 12A schematically illustrates a transmission 108 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the ring gear 54. A second intermediate coupling member 76 operatively connects the ring gear 42 to the planet carrier 46. A third intermediate coupling member 80 operatively connects the ring gear 48 to the sun gear 50. The third intermediate coupling member is selectively coupled to the sun gear 56 and the planet carrier 52 (which in this embodiment is a double orbit carrier having an inner set of planet gears and an outer set of planet gears) by the third clutch 72. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 12B discloses a truth table 158 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 108 shown in FIG. 12A. In this embodiment, the planetary gear sets 30, 32, 34, and 36 are configured to have a ring-to-sun gear ratio $N_{ring}/N_{sun}$ of 3.42, 2.33, 3.02, and 1.85, respectively, to obtain the forward and reverse speed ratios noted in the truth table. The ring-to-sun gear ratios $N_{ring}/N_{sun}$ are exemplary, as components of the transmission may be modified to achieve different ratios.

FIG. 13A schematically illustrates a transmission 109 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. The planet carrier 40 is connected to a first intermediate coupling member 74 which in turn is selectively coupled to the ring gear 60 by the first clutch 68. A second intermediate coupling member 76 operatively connects the ring gear 42 to the planet carrier 46. A third intermediate coupling member 78 operatively connects the ring gear 48 to the sun gear 50. The planet carrier 52 is selectively coupled to the ring gear 54 and the sun gear 56 by the third clutch 72. The ring gear 60 is selectively coupled to the housing 14 by the first brake 62. The planet carrier 58 is operatively connected to the output member 20.

FIG. 13B discloses a truth table 159 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 109 shown in FIG. 13A. In this embodiment, the planetary gear sets 30, 32, 34, and 36 are configured to have a ring-to-sun gear ratio $N_{ring}/N_{sun}$ of 3.75, 2.50, 1.88, and 2.01, respectively, to obtain the forward and reverse speed ratios noted in the truth table. The ring-to-sun gear ratios $N_{ring}/N_{sun}$ are exemplary, as components of the transmission may be modified to achieve different ratios.

Figures 14A, 14B:
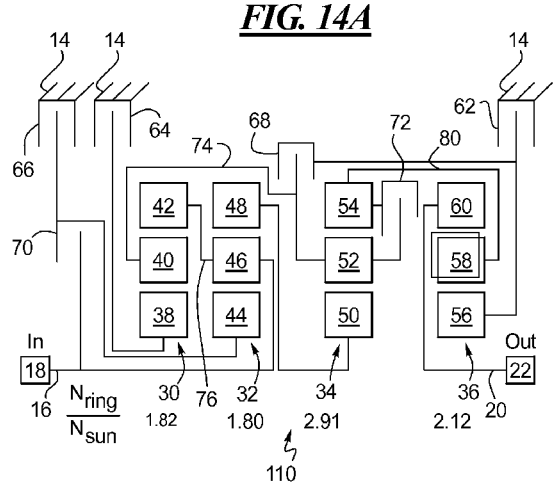
FIG. 14A is a schematic of a transmission in accordance with an additional embodiment of the present disclosure.
FIG. 14B is a chart identifying the engaged control elements, ratio reductions, and step percents for each gear provided by the transmission of FIG. 14A.

FIG. 14A schematically illustrates a transmission 110 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the planet carrier 52. The first intermediate coupling member 74 is further selectively coupled to the sun gear 56 by the first clutch 68, and selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50. The planet carrier 52 is selectively coupled to the ring gear 54 by the third clutch 72. A fourth intermediate coupling 80 operatively connects the ring gear 54 to the planet carrier 58 (which in this embodiment is a double orbit carrier having an inner set of planet gears and an outer set of planet gears). The ring gear 60 is operatively connected to the output member 20.

FIG. 14B discloses a truth table 160 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 110 shown in FIG. 14A. In this embodiment, the planetary gear sets 30, 32, 34, and 36 are configured to have a ring-to-sun gear ratio $N_{ring}/N_{sun}$ of 1.82, 1.80, 2.91, and 2.12, respectively, to obtain the forward and reverse speed ratios noted in the truth table. The ring-to-sun gear ratios $N_{ring}/N_{sun}$ are exemplary, as components of the transmission may be modified to achieve different ratios.

Figures 15A, 15B:
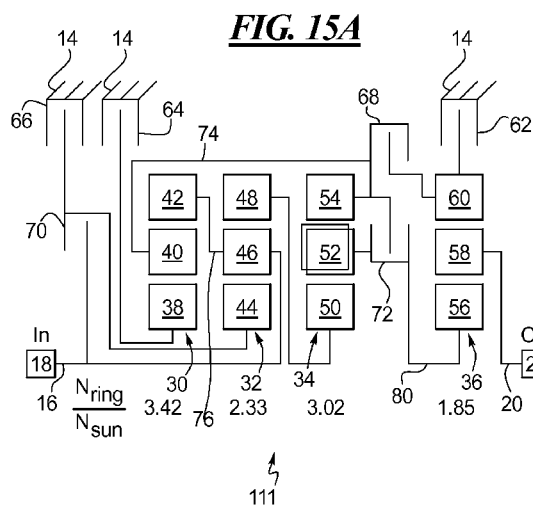
FIG. 15A is a schematic of a transmission in accordance with an additional embodiment of the present disclosure.
FIG. 15B is a chart identifying the engaged control elements, ratio reductions, and step percents for each gear provided by the transmission of FIG. 15A.

FIG. 15A schematically illustrates a transmission 111 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the ring gear 54, and is selectively connected to the ring gear 60 by the first clutch 68. A second intermediate coupling member 76 operatively connects the ring gear 42 to the planet carrier 46. A third intermediate coupling member 78 operatively connects the ring gear 48 to the sun gear 50. A fourth intermediate coupling 80 operatively connects the planet carrier 52 (which in this embodiment is a double orbit carrier having an inner set of planet gears and an outer set of planet gears) to the sun gear 56, and is selectively coupled to the ring gear 54 by the third clutch 72. The ring gear 60 is further selectively coupled to the housing 14 by the first brake 62. The planet carrier 58 is operatively connected to the output member 20.

FIG. 15B discloses a truth table 161 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 111 shown in FIG. 15A. In this embodiment, the planetary gear sets 30, 32, 34, and 36 are configured to have a ring-to-sun gear ratio $N_{ring}/N_{sun}$ of 3.42, 2.33, 3.02, and 1.85, respectively, to obtain the forward and reverse speed ratios noted in the truth table. The ring-to-sun gear ratios $N_{ring}/N_{sun}$ are exemplary, as components of the transmission may be modified to achieve different ratios.

Figures 16A, 16B:
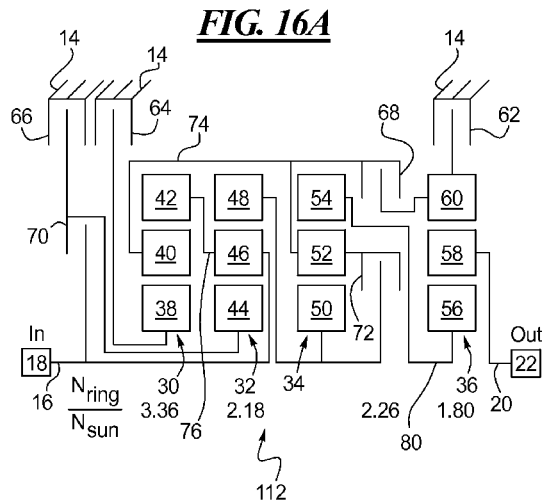
FIG. 16A is a schematic of a transmission in accordance with an additional embodiment of the present disclosure.
FIG. 16B is a chart identifying the engaged control elements, ratio reductions, and step percents for each gear provided by the transmission of FIG. 16A.

FIG. 16A schematically illustrates a transmission 112 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the planet carrier 52, and is selectively connected to the ring gear 60 by the first clutch 68. A second intermediate coupling member 76 operatively connects the ring gear 42 to the planet carrier 46. A third intermediate coupling member 78 operatively connects the ring gear 48 to the sun gear 50, and is selectively coupled to the planet carrier 52 by the third clutch 72. A fourth intermediate coupling 80 operatively connects the ring gear 54 to the sun gear 56. The ring gear 60 is further selectively coupled to the housing 14 by the first brake 62. The planet carrier 58 is operatively connected to the output member 20.

FIG. 16B discloses a truth table 162 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 112 shown in FIG. 16A. In this embodiment, the planetary gear sets 30, 32, 34, and 36 are configured to have a ring-to-sun gear ratio $N_{ring}/N_{sun}$ of 3.36, 2.18, 2.26, and 1.80, respectively, to obtain the forward and reverse speed ratios noted in the truth table. The ring-to-sun gear ratios $N_{ring}/N_{sun}$ are exemplary, as components of the transmission may be modified to achieve different ratios.

Figures 17A, 17B:
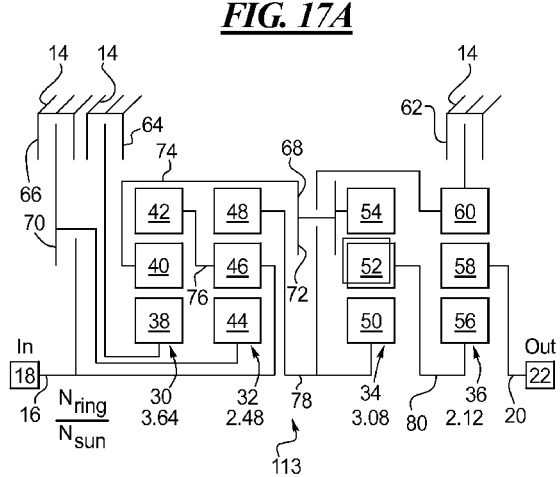
FIG. 17A is a schematic of a transmission in accordance with an additional embodiment of the present disclosure.
FIG. 17B is a chart identifying the engaged control elements, ratio reductions, and step percents for each gear provided by the transmission of FIG. 17A.

FIG. 17A schematically illustrates a transmission 113 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 is connected to the planet carrier 40 and the ring gear 54. A second intermediate coupling member 76 operatively connects the ring gear 42 to the planet carrier 46. A third intermediate coupling member 78 operatively connects the ring gear 48 to the sun gear 50, and is selectively coupled to the first intermediate coupling member 74 and ring gear 54 by the third clutch 72. The first intermediate coupling member 74 and ring gear 54 are further selectively coupled to the ring gear 60 by the first clutch 68. A fourth intermediate coupling 80 operatively connects the planet carrier 52 (which in this embodiment is a double orbit carrier having an inner set of planet gears and an outer set of planet gears) to the sun gear 56. The ring gear 60 is further selectively coupled to the housing 14 by the first brake 62. The planet carrier 58 is operatively connected to the output member 20.

FIG. 17B discloses a truth table 163 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 113 shown in FIG. 17A. In this embodiment, the planetary gear sets 30, 32, 34, and 36 are configured to have a ring-to-sun gear ratio $N_{ring}/N_{sun}$ of 3.64, 2.48, 3.08, and 2.12, respectively, to obtain the forward and reverse speed ratios noted in the truth table. The ring-to-sun gear ratios $N_{ring}/N_{sun}$ are exemplary, as components of the transmission may be modified to achieve different ratios.

Figures 18A, 18B:
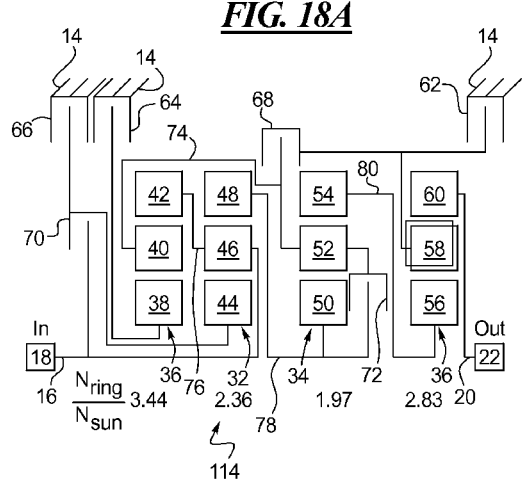
FIG. 18A is a schematic of a transmission in accordance with an additional embodiment of the present disclosure.
FIG. 18B is a chart identifying the engaged control elements, ratio reductions, and step percents for each gear provided by the transmission of FIG. 18A.

FIG. 18A schematically illustrates a transmission 114 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 is selectively coupled to the housing 14 by the third brake 66. A first intermediate coupling member 74 operatively connects the planet carrier 40 to the planet carrier 52, is selectively coupled to the planet carrier 58 (which in this embodiment is a double orbit carrier having an inner set of planet gears and an outer set of planet gears) by the first clutch 68, and is selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50, and is selectively coupled to the planet carrier 52 by the third clutch 72. A fourth intermediate coupling 80 operatively connects the ring gear 54 to the sun gear 56. The planet carrier 58 is further selectively coupled to the housing 14 by the first brake 62. The ring gear 60 is operatively connected to the output member 20.

FIG. 18B discloses a truth table 164 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 114 shown in FIG. 18A. In this embodiment, the planetary gear sets 30, 32, 34, and 36 are configured to have a ring-to-sun gear ratio $N_{ring}/N_{sun}$ of 3.44, 2.36, 1.97, and 2.83, respectively, to obtain the forward and reverse speed ratios noted in the truth table. The ring-to-sun gear ratios $N_{ring}/N_{sun}$ are exemplary, as components of the transmission may be modified to achieve different ratios.

Figures 19A, 19B:
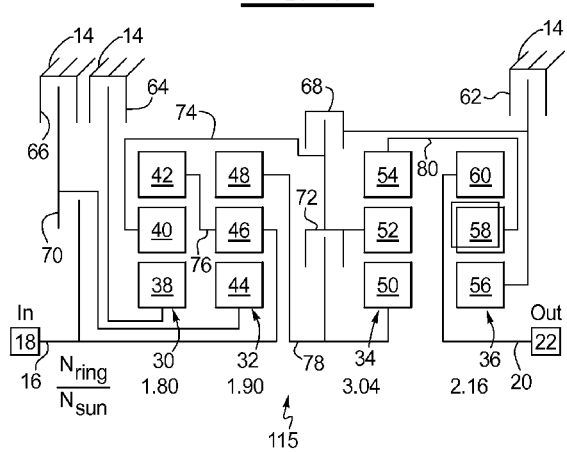
FIG. 19A is a schematic of a transmission in accordance with an additional embodiment of the present disclosure.
FIG. 19B is a chart identifying the engaged control elements, ratio reductions, and step percents for each gear provided by the transmission of FIG. 19A.

FIG. 19A schematically illustrates a transmission 115 and the various connections between the gear components and control elements, including the input member 16 being operatively coupled to the planet carrier 46 and selectively coupled to the sun gear 44 via the second clutch 70. The sun gear 38 is selectively coupled to the housing 14 by the second brake 64. The sun gear 44 also is selectively coupled to the housing 14 by the third brake 66. A first intermediate coupling member 74 operatively connects the planet carrier 40 to the planet carrier 52, is selectively coupled to the sun gear 56 by the first clutch 68, and is selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50, is selectively coupled to the planet carrier 52 and the first intermediate coupling member 74 by the third clutch 72, is selectively coupled to the sun gear 56 by the first clutch 68, and is selectively coupled to the housing 14 by the first clutch 68 and the first brake 62. A fourth intermediate coupling 80 operatively connects the ring gear 54 to the planet carrier 58 (which in this embodiment is a double orbit carrier having an inner set of planet gears and an outer set of planet gears). The sun gear 56 is selectively coupled to the housing 14 by the first brake 62. The ring gear 60 is operatively connected to the output member 20.

FIG. 19B discloses a truth table 165 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 115 shown in FIG. 19A. In this embodiment, the planetary gear sets 30, 32, 34, and 36 are configured to have a ring-to-sun gear ratio $N_{ring}/N_{sun}$ of 1.80, 1.90, 3.04, and 2.16, respectively, to obtain the forward and reverse speed ratios noted in the truth table. The ring-to-sun gear ratios $N_{ring}/N_{sun}$ are exemplary, as components of the transmission may be modified to achieve different ratios.

Figures 20A, 20B:
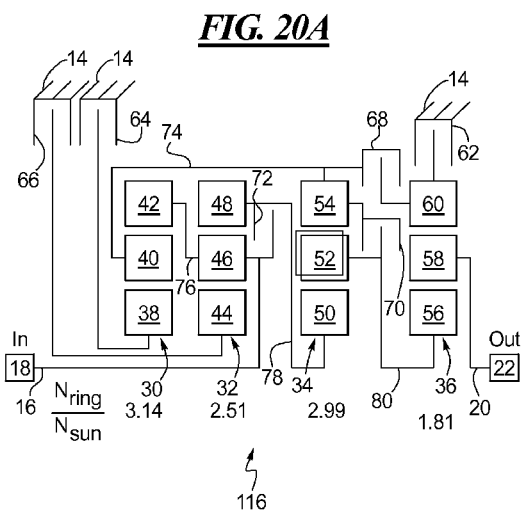
FIG. 20A is a schematic of a transmission in accordance with an additional embodiment of the present disclosure.
FIG. 20B is a chart identifying the engaged control elements, ratio reductions, and step percents for each gear provided by the transmission of FIG. 20A.

FIG. 20A schematically illustrates a transmission 116 and the various connections between the gear components and control elements, including the input member 16 being operatively coupled to the planet carrier 46, and selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the ring gear 54, and is selectively coupled to the ring gear 60 by the first clutch 68. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. The planet carrier 52 (which in this embodiment is a double orbit carrier having an inner set of planet gears and an outer set of planet gears) is operatively connected to the sun gear 56 and is selectively coupled to the ring gear 54 by the second clutch 70. The ring gear 54 is selectively coupled to the ring gear 60 by the first clutch 68. The ring gear 60 is selectively coupled to the housing 14 by the first brake 62. The planet carrier 58 is operatively connected to the output member 20.

FIG. 20B discloses a truth table 166 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 116 shown in FIG. 20A. In this embodiment, the planetary gear sets 30, 32, 34, and 36 are configured to have a ring-to-sun gear ratio $N_{ring}/N_{sun}$ of 3.14, 2.51, 2.99, and 1.81, respectively, to obtain the forward and reverse speed ratios noted in the truth table. The ring-to-sun gear ratios $N_{ring}/N_{sun}$ are exemplary, as components of the transmission may be modified to achieve different ratios.

Figures 21A, 21B:
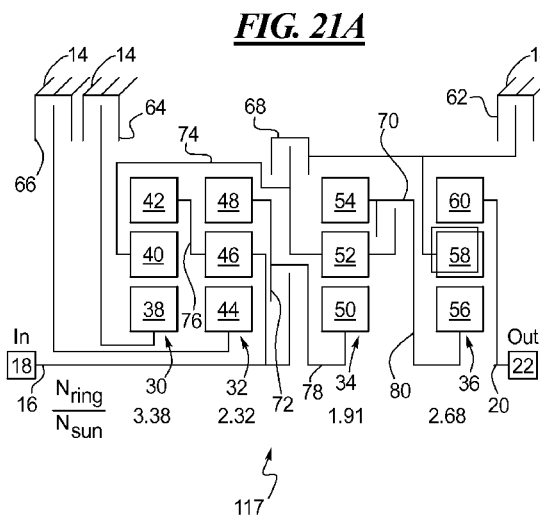
FIG. 21A is a schematic of a transmission in accordance with an additional embodiment of the present disclosure.
FIG. 21B is a chart identifying the engaged control elements, ratio reductions, and step percents for each gear provided by the transmission of FIG. 21A.

FIG. 21A schematically illustrates a transmission 117 and the various connections between the gear components and control elements, including the input member 16 being operatively coupled to the planet carrier 46, and selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, is selectively coupled to the planet carrier 58 by the first clutch 68, and is selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. The planet carrier 52 is selectively coupled to the housing 14 by the first clutch 68 and first brake 62, and is selectively coupled to the ring gear 54 and sun gear 56 by the second clutch 70. The ring gear 54 is operatively connected to the sun gear 56 by a fourth intermediate coupling member 80. The planet carrier 58 (which in this embodiment is a double orbit carrier having an inner set of planet gears and an outer set of planet gears) is selectively coupled to the housing 14 by the first brake 62 and selectively coupled to the first intermediate coupling member 74 by the first clutch 68. The ring gear 60 is operatively connected to the output member 20.

FIG. 21B discloses a truth table 167 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 117 shown in FIG. 21A. In this embodiment, the planetary gear sets 30, 32, 34, and 36 are configured to have a ring-to-sun gear ratio $N_{ring}/N_{sun}$ of 3.38, 2.32, 1.91, and 2.68, respectively, to obtain the forward and reverse speed ratios noted in the truth table. The ring-to-sun gear ratios $N_{ring}/N_{sun}$ are exemplary, as components of the transmission may be modified to achieve different ratios.

Figures 22A, 22B:
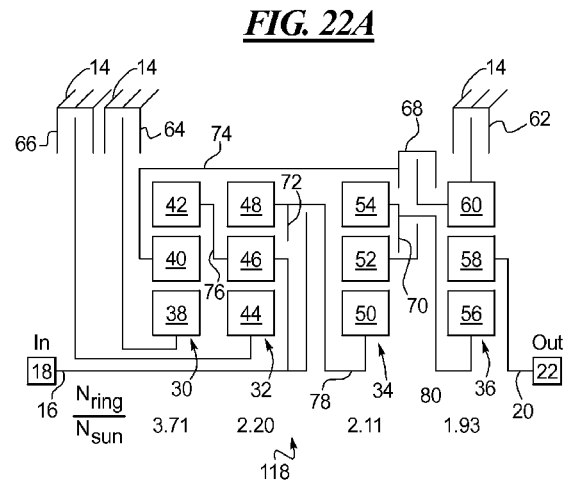
FIG. 22A is a schematic of a transmission in accordance with an additional embodiment of the present disclosure.
FIG. 22B is a chart identifying the engaged control elements, ratio reductions, and step percents for each gear provided by the transmission of FIG. 22A.

FIG. 22A schematically illustrates a transmission 118 and the various connections between the gear components and control elements, including the input member 16 being operatively coupled to the planet carrier 46, and selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 selectively couples the planet carrier 40 to the ring gear 60 by the first clutch 68. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. A fourth intermediate coupling member 80 operatively connects the ring gear 54 to the sun gear 56, and is selectively coupled to the planet carrier 52 by the second clutch 70. The ring gear 60 is selectively coupled to the housing 14 by the first brake 62 and selectively coupled to the first intermediate coupling member 74 by the first clutch 68. The planet carrier 58 is operatively connected to the output member 20.

FIG. 22B discloses a truth table 168 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 118 shown in FIG. 22A. In this embodiment, the planetary gear sets 30, 32, 34, and 36 are configured to have a ring-to-sun gear ratio $N_{ring}/N_{sun}$ of 3.71, 2.20, 2.11, and 1.93, respectively, to obtain the forward and reverse speed ratios noted in the truth table. The ring-to-sun gear ratios $N_{ring}/N_{sun}$ are exemplary, as components of the transmission may be modified to achieve different ratios.

Figures 23A, 23B:
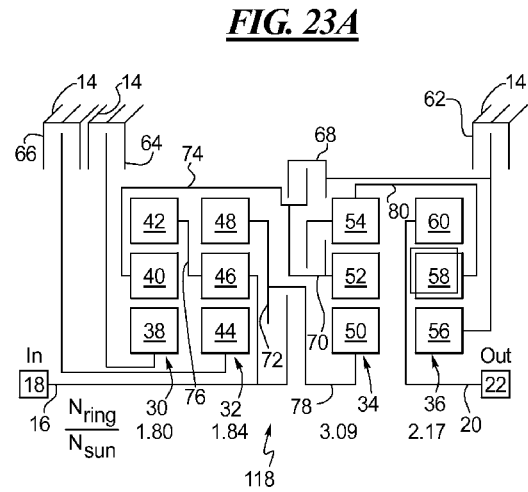
FIG. 23A is a schematic of a transmission in accordance with an additional embodiment of the present disclosure.
FIG. 23B is a chart identifying the engaged control elements, ratio reductions, and step percents for each gear provided by the transmission of FIG. 23A.

FIG. 23A schematically illustrates a transmission 119 and the various connections between the gear components and control elements, including the input member 16 being operatively coupled to the planet carrier 46, and selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, is selectively coupled to the ring gear 54 by the second clutch 70, is selectively coupled to the sun gear 56 by the first clutch 68, and is selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. The planet carrier 52 is selectively coupled to the ring gear 54 by the second clutch 70. A fourth intermediate coupling member 80 operatively connects the ring gear 54 to the planet carrier 58 (which in this embodiment is a double orbit carrier having an inner set of planet gears and an outer set of planet gears). The sun gear 56 is selectively coupled to the housing 14 by the first brake 62, and is selectively coupled to the first intermediate coupling member 74 by the first clutch 68. The ring gear 60 is operatively connected to the output member 20.

FIG. 23B discloses a truth table 169 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 119 shown in FIG. 23A. In this embodiment, the planetary gear sets 30, 32, 34, and 36 are configured to have a ring-to-sun gear ratio $N_{ring}/N_{sun}$ of 1.80, 1.84, 3.09, and 2.17, respectively, to obtain the forward and reverse speed ratios noted in the truth table. The ring-to-sun gear ratios $N_{ring}/N_{sun}$ are exemplary, as components of the transmission may be modified to achieve different ratios.

Figures 24A, 24B:
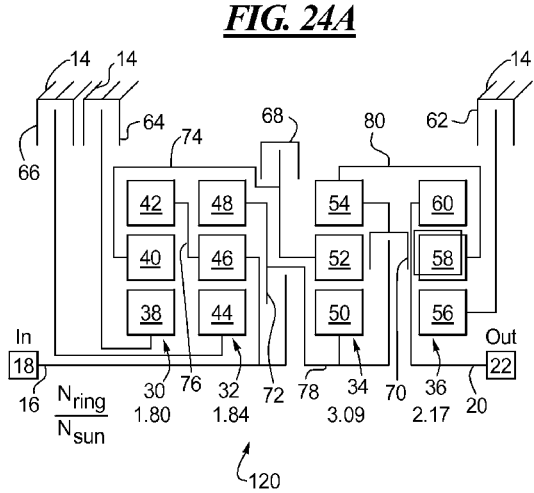
FIG. 24A is a schematic of a transmission in accordance with an additional embodiment of the present disclosure.
FIG. 24B is a chart identifying the engaged control elements, ratio reductions, and step percents for each gear provided by the transmission of FIG. 24A.

FIG. 24A schematically illustrates a transmission 120 and the various connections between the gear components and control elements, including the input member 16 being operatively coupled to the planet carrier 46, being selectively coupled to the ring gear 48 and sun gear 50 by the third clutch 72, and being selectively coupled to the ring gear 54 by the second and third clutches 70, 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, is selectively coupled to the sun gear 56 by the first clutch 68, and is selectively coupled to the housing 14 by the first clutch 68 and the first brake 62. A second intermediate coupling member 76 operatively connects the ring gear 42 to the planet carrier 46. A third intermediate coupling member 78 operatively connects the ring gear 48 to the sun gear 50, is selectively coupled to the planet carrier 46 and input member 16 by the third clutch 72, and is selectively coupled to the ring gear 54 by the second clutch 70. The planet carrier 52 is selectively coupled to the sun gear 56 by the second clutch 70. The ring gear 54 is selectively coupled to the third intermediate coupling member 78 by the second clutch 70, and a fourth intermediate coupling member 80 operatively connects the ring gear 54 to the planet carrier 58 (which in this embodiment is a double orbit carrier having an inner set of planet gears and an outer set of planet gears). The sun gear 56 is selectively coupled to the housing 14 by the first brake 62, and is selectively coupled to the first intermediate coupling member 74 by the first clutch 68. The ring gear 60 is operatively connected to the output member 20.

FIG. 24B discloses a truth table 170 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 120 shown in FIG. 24A. In this embodiment, the planetary gear sets 30, 32, 34, and 36 are configured to have a ring-to-sun gear ratio $N_{ring}/N_{sun}$ of 1.80, 1.84, 3.09, and 2.17, respectively, to obtain the forward and reverse speed ratios noted in the truth table. The ring-to-sun gear ratios $N_{ring}/N_{sun}$ are exemplary, as components of the transmission may be modified to achieve different ratios.

Figures 25A, 25B:
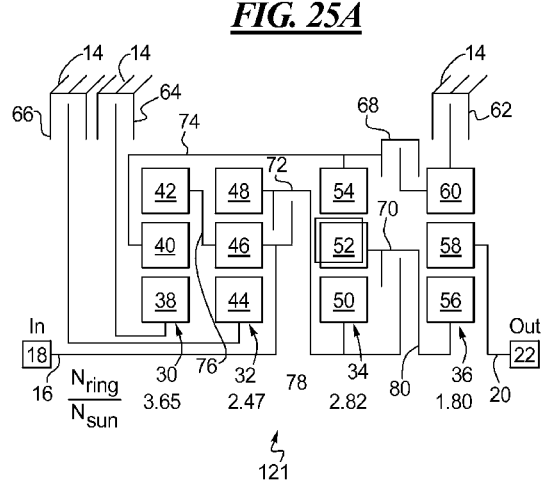
FIG. 25A is a schematic of a transmission in accordance with an additional embodiment of the present disclosure.
FIG. 25B is a chart identifying the engaged control elements, ratio reductions, and step percents for each gear provided by the transmission of FIG. 25A.

FIG. 25A schematically illustrates a transmission 121 and the various connections between the gear components and control elements, including the input member 16 being operatively coupled to the planet carrier 46, being selectively coupled to the ring gear 48 and sun gear 50 by the third clutch 72, and being selectively coupled to the planet carrier 52 and the sun gear 56 by the second and third clutches 70, 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the ring gear 54, and is selectively coupled to the ring gear 60 by the first clutch 68. A second intermediate coupling member 76 operatively connects the ring gear 42 to the planet carrier 46. A third intermediate coupling member 78 operatively connects the ring gear 48 to the sun gear 50, is selectively coupled to the planet carrier 46 and input member 16 by the third clutch 72, and is selectively coupled to the planet carrier 52 and sun gear 56 by the second clutch 70. The planet carrier 52 (which in this embodiment is a double orbit carrier having an inner set of planet gears and an outer set of planet gears) is operatively connected to the sun gear 56 by a fourth intermediate coupling member 80, and is selectively coupled to the third intermediate coupling member 78 by the second clutch 70. The ring gear 54 is selectively coupled to the ring gear 60 by the first clutch 68. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 25B discloses a truth table 171 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 121 shown in FIG. 25A. In this embodiment, the planetary gear sets 30, 32, 34, and 36 are configured to have a ring-to-sun gear ratio $N_{ring}/N_{sun}$ of 3.65, 2.47, 2.82, and 1.80, respectively, to obtain the forward and reverse speed ratios noted in the truth table. The ring-to-sun gear ratios $N_{ring}/N_{sun}$ are exemplary, as components of the transmission may be modified to achieve different ratios.

Figures 26A, 26B:
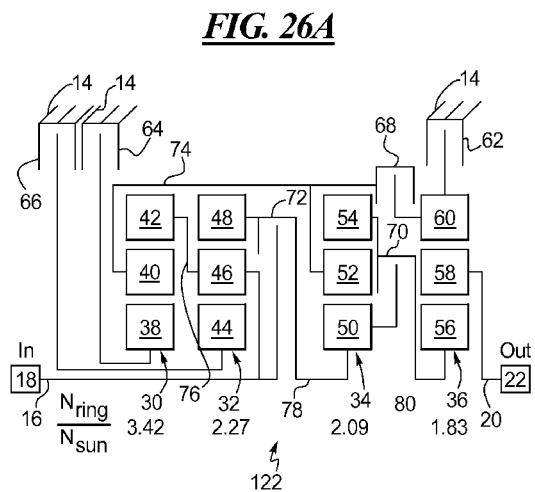
FIG. 26A is a schematic of a transmission in accordance with an additional embodiment of the present disclosure.
FIG. 26B is a chart identifying the engaged control elements, ratio reductions, and step percents for each gear provided by the transmission of FIG. 26A.

FIG. 26A schematically illustrates a transmission 122 and the various connections between the gear components and control elements, including the input member 16 being operatively coupled to the planet carrier 46, and being selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, and is selectively coupled to the ring gear 60 by the first clutch 68. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. The planet carrier 52 is selectively coupled to the ring gear 60 by the first clutch 68. The ring gear 54 is operatively connected to the sun gear 56, and is selectively coupled to the sun gear 50 by the second clutch 70. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 26B discloses a truth table 172 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 122 shown in FIG. 26A. In this embodiment, the planetary gear sets 30, 32, 34, and 36 are configured to have a ring-to-sun gear ratio $N_{ring}/N_{sun}$ of 3.42, 2.27, 2.09, and 1.83, respectively, to obtain the forward and reverse speed ratios noted in the truth table. The ring-to-sun gear ratios $N_{ring}/N_{sun}$ are exemplary, as components of the transmission may be modified to achieve different ratios.

FIG. 27A schematically illustrates a transmission 123 and the various connections between the gear components and control elements, including the input member 16 being operatively coupled to the planet carrier 46, and being selectively coupled to the ring gear 48 and sun gear 50 by the third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, is selectively coupled to the planet carrier 58 by the first clutch 68, and is selectively coupled to the housing 14 by the first clutch 68 and first brake 62. A second intermediate coupling member 76 operatively connects the ring gear 42 to the planet carrier 46. A third intermediate coupling member 78 operatively connects the ring gear 48 to the sun gear 50, and is selectively coupled to the planet carrier 46 and input member 16 by the third clutch 72. The sun gear 50 is selectively coupled to the ring gear 54 and sun gear 56 by the second clutch 70. The planet carrier 52 is selectively coupled to the housing 14 by the first clutch 68 and the first brake 62. The ring gear 54 is operatively connected to the sun gear 56, and is selectively coupled to the sun gear 50 by the second clutch 70. The planet carrier 58 (which in this embodiment is a double orbit carrier having an inner set of planet gears and an outer set of planet gears) is selectively coupled to the housing 14 by the first brake 62 and is selectively coupled to the first intermediate coupling member 74 by the first clutch 68. The ring gear 60 is operatively connected to the output member 20.

FIG. 27B discloses a truth table 173 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 123 shown in FIG. 27A. In this embodiment, the planetary gear sets 30, 32, 34, and 36 are configured to have a ring-to-sun gear ratio $N_{ring}/N_{sun}$ of 3.37, 2.32, 2.05, and 2.80, respectively, to obtain the forward and reverse speed ratios noted in the truth table. The ring-to-sun gear ratios $N_{ring}/N_{sun}$ are exemplary, as components of the transmission may be modified to achieve different ratios.

Figures 28A, 28B:
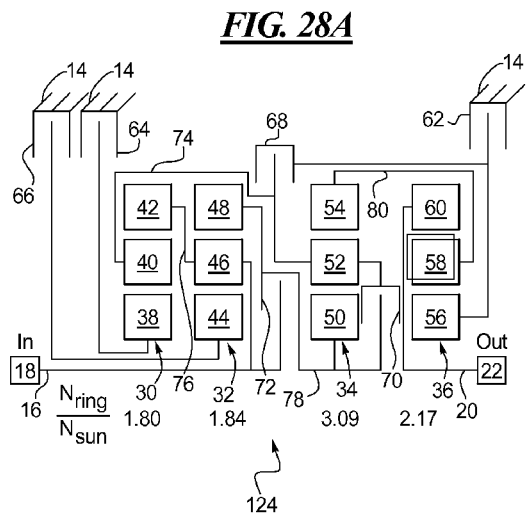
FIG. 28A is a schematic of a transmission in accordance with an additional embodiment of the present disclosure.
FIG. 28B is a chart identifying the engaged control elements, ratio reductions, and step percents for each gear provided by the transmission of FIG. 28A.

FIG. 28A schematically illustrates a transmission 124 and the various connections between the gear components and control elements, including the input member 16 being operatively coupled to the planet carrier 46, being selectively coupled to the ring gear 48 and sun gear 50 by the third clutch 72, and being selectively coupled to the planet carrier 52 by the second clutch 70 and third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, is selectively coupled to the sun gear 56 by the first clutch 68, and is selectively coupled to the housing 14 by the first clutch 68 and first brake 62. A second intermediate coupling member 76 operatively connects the ring gear 42 to the planet carrier 46. A third intermediate coupling member 78 operatively connects the ring gear 48 to the sun gear 50, is selectively coupled to the planet carrier 46 and input member 16 by the third clutch 72, and is selectively coupled to the planet carrier 52 by the second clutch 70. The sun gear 50 is selectively coupled to the planet carrier 52 by the second clutch 70. The planet carrier 52 is selectively coupled to the sun gear 56 by the first clutch 68, and is selectively coupled to the housing 14 by the first clutch 68 and the first brake 62. The ring gear 54 is operatively connected to the planet carrier 58 (which in this embodiment is a double orbit carrier having an inner set of planet gears and an outer set of planet gears) by a fourth intermediate coupling member 80. The sun gear 56 is selectively coupled to the housing 14 by the first brake 62, and is selectively coupled to the first intermediate coupling member 74 by the first clutch 68. The ring gear 60 is operatively connected to the output member 20.

FIG. 28B discloses a truth table 174 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 124 shown in FIG. 28A. In this embodiment, the planetary gear sets 30, 32, 34, and 36 are configured to have a ring-to-sun gear ratio $N_{ring}/N_{sun}$ of 1.80, 1.84, 3.09, and 2.17, respectively, to obtain the forward and reverse speed ratios noted in the truth table. The ring-to-sun gear ratios $N_{ring}/N_{sun}$ are exemplary, as components of the transmission may be modified to achieve different ratios.

Figures 29A, 29B:
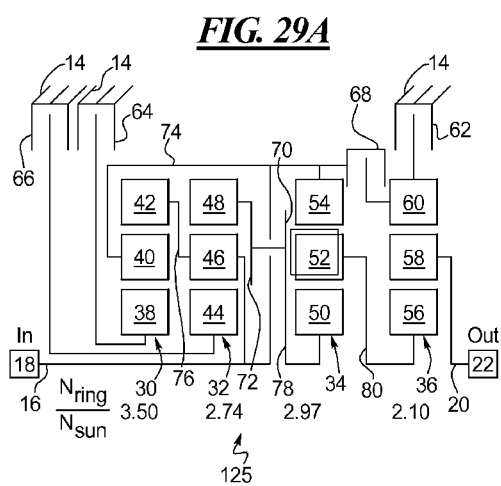
FIG. 29A is a schematic of a transmission in accordance with an additional embodiment of the present disclosure.
FIG. 29B is a chart identifying the engaged control elements, ratio reductions, and step percents for each gear provided by the transmission of FIG. 29A.

FIG. 29A schematically illustrates a transmission 125 and the various connections between the gear components and control elements, including the input member 16 being operatively coupled to the planet carrier 46, being selectively coupled to the sun gear 50 and ring gear 48 by the third clutch 72, being selectively coupled to the ring gear 54 and planet carrier 40 by the second clutch 70 and third clutch 72, and being selectively coupled to the ring gear 60 by the first clutch 68, second clutch 70, and third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the ring gear 54, and is selectively coupled to the ring gear 60 by the first clutch 68. A second intermediate coupling member 76 operatively connects the ring gear 42 to the planet carrier 46. A third intermediate coupling member 78 is connected to the sun gear 50 and ring gear 48, and is selectively coupled to the input member 16, planet carrier 46, planet carrier 40, and ring gear 54 by the second and third clutches 70, 72. A fourth intermediate coupling member 80 operatively connects the planet carrier 52 (which in this embodiment is a double orbit carrier having an inner set of planet gears and an outer set of planet gears) to the sun gear 56. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 29B discloses a truth table 175 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 125 shown in FIG. 29A. In this embodiment, the planetary gear sets 30, 32, 34, and 36 are configured to have a ring-to-sun gear ratio $N_{ring}/N_{sun}$ of 3.50, 2.74, 2.97, and 2.10, respectively, to obtain the forward and reverse speed ratios noted in the truth table. The ring-to-sun gear ratios $N_{ring}/N_{sun}$ are exemplary, as components of the transmission may be modified to achieve different ratios.

Figures 30A, 30B:
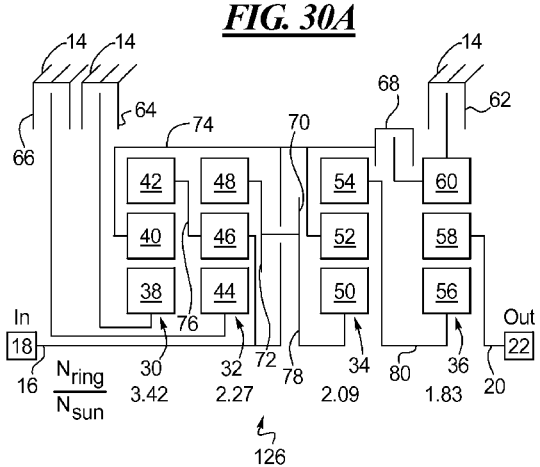
FIG. 30A is a schematic of a transmission in accordance with an additional embodiment of the present disclosure.
FIG. 30B is a chart identifying the engaged control elements, ratio reductions, and step percents for each gear provided by the transmission of FIG. 30A.

FIG. 30A schematically illustrates a transmission 126 and the various connections between the gear components and control elements, including the input member 16 being operatively coupled to the planet carrier 46, being selectively coupled to the sun gear 50 and ring gear 48 by the third clutch 72, being selectively coupled to the ring gear 48, planet carrier 52, and planet carrier 40 by the second clutch 70 and third clutch 72, and being selectively coupled to the ring gear 60 by the first clutch 68, second clutch 70, and third clutch 72. The sun gear 38 is selectively coupled to the housing 14 by the second brake 64, and the sun gear 44 is selectively coupled to the housing 14 by the third brake 66. A first intermediate coupling member 74 operatively connects the planet carrier 40 to the planet carrier 52, and is selectively coupled to the ring gear 60 by the first clutch 68. A second intermediate coupling member 76 operatively connects the ring gear 42 to the planet carrier 46. A third intermediate coupling member 78 is connected to the ring gear 48 and the sun gear 50, and is selectively coupled to the input member 16, planet carrier 46, planet carrier 40, and planet carrier 52 by the second and third clutches 70, 72. A fourth intermediate coupling member 80 operatively connects the ring gear 54 to the sun gear 56. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 30B discloses a truth table 176 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 126 shown in FIG. 30A. In this embodiment, the planetary gear sets 30, 32, 34, and 36 are configured to have a ring-to-sun gear ratio $N_{ring}/N_{sun}$ of 3.42, 2.27, 2.09, and 1.83, respectively, to obtain the forward and reverse speed ratios noted in the truth table. The ring-to-sun gear ratios $N_{ring}/N_{sun}$ are exemplary, as components of the transmission may be modified to achieve different ratios.

Figures 31A, 31B:
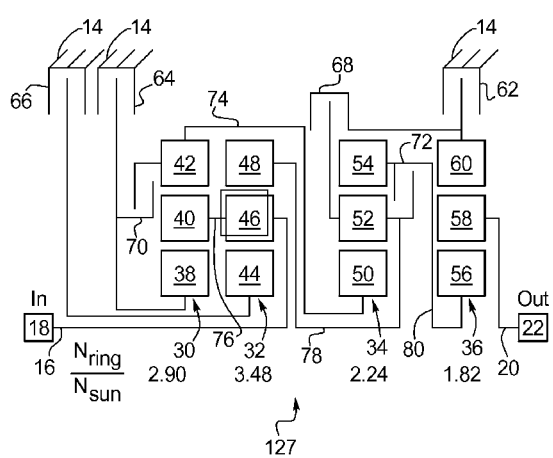
FIG. 31A is a schematic of a transmission in accordance with an additional embodiment of the present disclosure.
FIG. 31B is a chart identifying the engaged control elements, ratio reductions, and step percents for each gear provided by the transmission of FIG. 31A.

FIG. 31A schematically illustrates a transmission 127 and the various connections between the gear components and control elements, including the input member 16 being operatively coupled to the planet carrier 46 (which in this embodiment is a double orbit carrier having an inner set of planet gears and an outer set of planet gears). The sun gear 38 is selectively coupled to the housing 14 by the second brake 64, and is selectively coupled to the ring gear 42 by the second clutch 70. The sun gear 44 is selectively coupled to the housing 14 by the third brake 66. A first intermediate coupling member 74 operatively connects the ring gear 42 to the sun gear 50. A second intermediate coupling member 76 operatively connects the planet carrier 40 to the planet carrier 46. A third intermediate coupling member 78 operatively connects the ring gear 48 to the planet carrier 52, and is selectively coupled to the ring gear 54 and sun gear 56 by the third clutch 72. The planet carrier 52 is selectively coupled to the ring gear 60 by the first clutch 68 and is selectively coupled to the housing 14 by the first clutch 68 and first brake 62. A fourth intermediate coupling member 80 operatively connects the ring gear 54 to the sun gear 56, and is selectively coupled to the third intermediate coupling member 78 by the third clutch 72. The ring gear 60 is selectively coupled to the housing 14 by the first brake 62, and is selectively coupled to the planet carrier 52 by the first clutch 68. The planet carrier 58 is operatively connected to the output member 20.

FIG. 31B discloses a truth table 177 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 127 shown in FIG. 31A. In this embodiment, the planetary gear sets 30, 32, 34, and 36 are configured to have a ring-to-sun gear ratio $N_{ring}/N_{sun}$ of 2.90, 3.48, 2.24, and 1.82, respectively, to obtain the forward and reverse speed ratios noted in the truth table. The ring-to-sun gear ratios $N_{ring}/N_{sun}$ are exemplary, as components of the transmission may be modified to achieve different ratios.

Figures 32A, 32B:
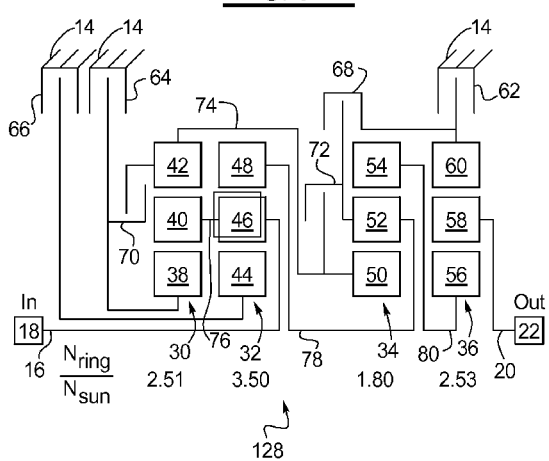
FIG. 32A is a schematic of a transmission in accordance with an additional embodiment of the present disclosure.
FIG. 32B is a chart identifying the engaged control elements, ratio reductions, and step percents for each gear provided by the transmission of FIG. 32A.

FIG. 32A schematically illustrates a transmission 128 and the various connections between the gear components and control elements, including the input member 16 being operatively coupled to the planet carrier 46 (which in this embodiment is a double orbit carrier having an inner set of planet gears and an outer set of planet gears). The sun gear 38 is selectively coupled to the housing 14 by the second brake 64, and is selectively coupled to the ring gear 42 by the second clutch 70. The sun gear 44 is selectively coupled to the housing 14 by the third brake 66. A first intermediate coupling member 74 operatively connects the ring gear 42 to the sun gear 50, is selectively coupled to the planet carrier 52 by the third clutch 72, is selectively coupled to the ring gear 60 by the first clutch 68 and third clutch 72, and is selectively coupled to the housing 14 by the first brake 62, first clutch 68, and third clutch 72. A second intermediate coupling member 76 operatively connects the planet carrier 40 to the planet carrier 46. A third intermediate coupling member 78 operatively connects the ring gear 48 to the planet carrier 52. A fourth intermediate coupling member 80 operatively connects the ring gear 54 to the sun gear 56. The ring gear 60 is selectively coupled to the housing 14 by the first brake 62, is selectively coupled to the planet carrier 52 by the first clutch 68, and is selectively coupled to the sun gear 50 and ring gear 48 by the first clutch 68 and third clutch 72. The planet carrier 58 is operatively connected to the output member 20.

FIG. 32B discloses a truth table 178 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 128 shown in FIG. 32A. In this embodiment, the planetary gear sets 30, 32, 34, and 36 are configured to have a ring-to-sun gear ratio $N_{ring}/N_{sun}$ of 2.51, 3.50, 1.80, and 2.53, respectively, to obtain the forward and reverse speed ratios noted in the truth table. The ring-to-sun gear ratios $N_{ring}/N_{sun}$ are exemplary, as components of the transmission may be modified to achieve different ratios.

FIG. 33A schematically illustrates a transmission 129 and the various connections between the gear components and control elements, including the input member 16 being operatively coupled to the planet carrier 46 and selectively coupled to the sun gear 44 by the second clutch 70. The sun gear 38 is selectively coupled to the housing 14 by the third brake 66. The sun gear 44 is selectively coupled to the housing 14 by the second brake 64. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 to the planet carrier 46 (which in this embodiment is a double orbit carrier having an inner set of planet gears and an outer set of planet gears). A third intermediate coupling member 78 operatively connects the ring gear 48 to the sun gear 50. A fourth intermediate coupling member 80 operatively connects the ring gear 54 to the sun gear 56, and is selectively coupled to the sun gear 50 by the third clutch 72. The planet carrier 52 is operatively connected to the ring gear 42 by the first intermediate coupling member 74, and is selectively coupled to the ring gear 60 by the first clutch 68. The ring gear 60 is selectively coupled to the housing 14 by the first brake 62. The planet carrier 58 is operatively connected to the output member 20.

FIG. 33B discloses a truth table 179 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 129 shown in FIG. 33A. In this embodiment, the planetary gear sets 30, 32, 34, and 36 are configured to have a ring-to-sun gear ratio $N_{ring}/N_{sun}$ of 3.38, 2.76, 2.43, and 1.81, respectively, to obtain the forward and reverse speed ratios noted in the truth table. The ring-to-sun gear ratios $N_{ring}/N_{sun}$ are exemplary, as components of the transmission may be modified to achieve different ratios.

Figures 34A, 34B:
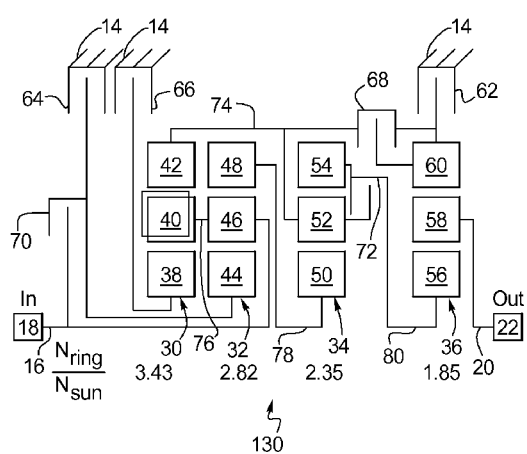
FIG. 34A is a schematic of a transmission in accordance with an additional embodiment of the present disclosure.
FIG. 34B is a chart identifying the engaged control elements, ratio reductions, and step percents for each gear provided by the transmission of FIG. 34A.

FIG. 34A schematically illustrates a transmission 130 and the various connections between the gear components and control elements, including the input member 16 being operatively coupled to the planet carrier 46 and selectively coupled to the sun gear 44 by the second clutch 70. The sun gear 38 is selectively coupled to the housing 14 by the third brake 66.

The sun gear 44 is selectively coupled to the housing 14 by the second brake 64. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 (which in this embodiment is a double orbit carrier having an inner set of planet gears and an outer set of planet gears) to the planet carrier 46. A third intermediate coupling member 78 operatively connects the ring gear 48 to the sun gear 50. A fourth intermediate coupling member 80 operatively connects the ring gear 54 to the sun gear 56, and is selectively coupled to the planet carrier 52 by the third clutch 72. The planet carrier 52 is operatively connected to the ring gear 42 by the first intermediate coupling member 74, and is selectively coupled to the ring gear 60 by the first clutch 68. The ring gear 60 is selectively coupled to the housing 14 by the first brake 62. The planet carrier 58 is operatively connected to the output member 20.

FIG. 34B discloses a truth table 180 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 130 shown in FIG. 34A. In this embodiment, the planetary gear sets 30, 32, 34, and 36 are configured to have a ring-to-sun gear ratio $N_{ring}/N_{sun}$ of 3.43, 2.82, 2.35, and 1.85, respectively, to obtain the forward and reverse speed ratios noted in the truth table. The ring-to-sun gear ratios $N_{ring}/N_{sun}$ are exemplary, as components of the transmission may be modified to achieve different ratios.

Figures 35A, 35B:
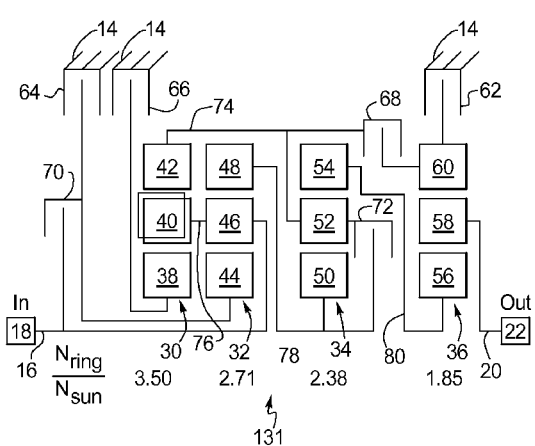
FIG. 35A is a schematic of a transmission in accordance with an additional embodiment of the present disclosure.
FIG. 35B is a chart identifying the engaged control elements, ratio reductions, and step percents for each gear provided by the transmission of FIG. 35A.

FIG. 35A schematically illustrates a transmission 131 and the various connections between the gear components and control elements, including the input member 16 being operatively coupled to the planet carrier 46 and selectively coupled to the sun gear 44 by the second clutch 70. The sun gear 38 is selectively coupled to the housing 14 by the third brake 66. The sun gear 44 is selectively coupled to the housing 14 by the second brake 64. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 (which in this embodiment is a double orbit carrier having an inner set of planet gears and an outer set of planet gears) to the planet carrier 46. A third intermediate coupling member 78 operatively connects the ring gear 48 to the sun gear 50, and is selectively coupled to the planet carrier 52 by the third clutch 72. A fourth intermediate coupling member 80 operatively connects the ring gear 54 to the sun gear 56. The planet carrier 52 is operatively connected to the ring gear 42 by the first intermediate coupling member 74, and is selectively coupled to the ring gear 60 by the first clutch 68. The ring gear 60 is selectively coupled to the housing 14 by the first brake 62. The planet carrier 58 is operatively connected to the output member 20.

FIG. 35B discloses a truth table 181 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 131 shown in FIG. 35A. In this embodiment, the planetary gear sets 30, 32, 34, and 36 are configured to have a ring-to-sun gear ratio $N_{ring}/N_{sun}$ of 3.50, 2.71, 2.38, 1.85, respectively, to obtain the forward and reverse speed ratios noted in the truth table. The ring-to-sun gear ratios $N_{ring}/N_{sun}$ are exemplary, as components of the transmission may be modified to achieve different ratios.

Figures 36A, 36B:
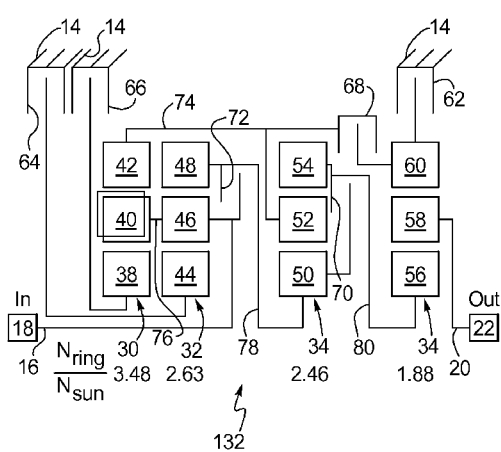
FIG. 36A is a schematic of a transmission in accordance with an additional embodiment of the present disclosure.
FIG. 36B is a chart identifying the engaged control elements, ratio reductions, and step percents for each gear provided by the transmission of FIG. 36A.

FIG. 36A schematically illustrates a transmission 132 and the various connections between the gear components and control elements, including the input member 16 being operatively coupled to the planet carrier 46, and selectively coupled to the ring gear 48 and sun gear 50 by the third clutch 72. The sun gear 44 is selectively coupled to the housing 14 by the second brake 64, and the sun gear 38 is selectively coupled to the housing 14 by the third brake 66. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 (which in this embodiment is a double orbit carrier having an inner set of planet gears and an outer set of planet gears) to the planet carrier 46. A third intermediate coupling member 78 operatively connects the ring gear 48 to the sun gear 50, and is selectively coupled to the planet carrier 46 by the third clutch 72. A fourth intermediate coupling member 80 operatively connects the ring gear 54 to the sun gear 56, and is selectively coupled to the sun gear 50 by the second clutch 70. The planet carrier 52 is operatively connected to the ring gear 42 by the first intermediate coupling member 74, and is selectively coupled to the ring gear 60 by the first clutch 68. The ring gear 60 is selectively coupled to the housing 14 by the first brake 62. The planet carrier 58 is operatively connected to the output member 20.

FIG. 36B discloses a truth table 182 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 132 shown in FIG. 36A. In this embodiment, the planetary gear sets 30, 32, 34, and 36 are configured to have a ring-to-sun gear ratio $N_{ring}/N_{sun}$ of 3.48, 2.63, 2.46, and 1.88, respectively, to obtain the forward and reverse speed ratios noted in the truth table. The ring-to-sun gear ratios $N_{ring}/N_{sun}$ are exemplary, as components of the transmission may be modified to achieve different ratios.

Figures 37A, 37B:
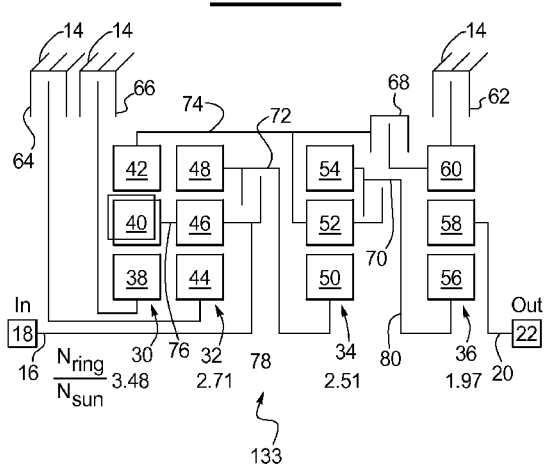
FIG. 37A is a schematic of a transmission in accordance with an additional embodiment of the present disclosure.
FIG. 37B is a chart identifying the engaged control elements, ratio reductions, and step percents for each gear provided by the transmission of FIG. 37A.

FIG. 37A schematically illustrates a transmission 133 and the various connections between the gear components and control elements, including the input member 16 being operatively coupled to the planet carrier 46, and selectively coupled to the ring gear 48 and sun gear 50 by the third clutch 72. The sun gear 44 is selectively coupled to the housing 14 by the second brake 64, and the sun gear 38 is selectively coupled to the housing 14 by the third brake 66. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 (which in this embodiment is a double orbit carrier having an inner set of planet gears and an outer set of planet gears) to the planet carrier 46. A third intermediate coupling member 78 operatively connects the ring gear 48 to the sun gear 50, and is selectively coupled to the planet carrier 46 by the third clutch 72. A fourth intermediate coupling member 80 operatively connects the ring gear 54 to the sun gear 56, and is selectively coupled to the planet carrier 52 by the second clutch 70. The planet carrier 52 is operatively connected to the ring gear 42 by the first intermediate coupling member 74, and is selectively coupled to the ring gear 60 by the first clutch 68. The ring gear 60 is selectively coupled to the housing 14 by the first brake 62. The planet carrier 58 is operatively connected to the output member 20.

FIG. 37B discloses a truth table 183 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 133 shown in FIG. 37A. In this embodiment, the planetary gear sets 30, 32, 34, and 36 are configured to have a ring-to-sun gear ratio $N_{ring}/N_{sun}$ of 3.48, 2.71, 2.51, and 1.97, respectively, to obtain the forward and reverse speed ratios noted in the truth table. The ring-to-sun gear ratios $N_{ring}/N_{sun}$ are exemplary, as components of the transmission may be modified to achieve different ratios.

Figures 38A, 38B:
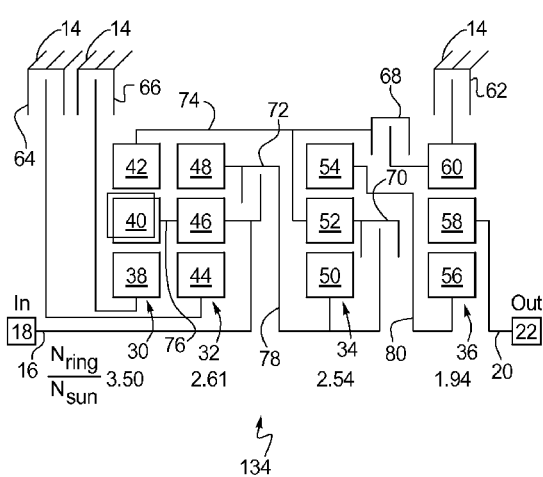
FIG. 38A is a schematic of a transmission in accordance with an additional embodiment of the present disclosure.
FIG. 38B is a chart identifying the engaged control elements, ratio reductions, and step percents for each gear provided by the transmission of FIG. 38A.

FIG. 38A schematically illustrates a transmission 134 and the various connections between the gear components and control elements, including the input member 16 being operatively coupled to the planet carrier 46, selectively coupled to the ring gear 48 and sun gear 50 by the third clutch 72, and selectively coupled to the planet carrier 52 by the second clutch 70 and third clutch 72. The sun gear 44 is selectively coupled to the housing 14 by the second brake 64, and the sun gear 38 is selectively coupled to the housing 14 by the third brake 66. A first intermediate coupling member 74 operatively connects the ring gear 42 to the planet carrier 52, and is selectively coupled to the ring gear 60 by the first clutch 68. A second intermediate coupling member 76 operatively connects the planet carrier 40 (which in this embodiment is a double orbit carrier having an inner set of planet gears and an outer set of planet gears) to the planet carrier 46. A third intermediate coupling member 78 operatively connects the ring gear 48 to the sun gear 50, is selectively coupled to the planet carrier 46 by the third clutch 72, and is selectively coupled to the planet carrier 52 by the second clutch 70. A fourth intermediate coupling member 80 operatively connects the ring gear 54 to the sun gear 56. The planet carrier 52 is operatively connected to the ring gear 42 by the first intermediate coupling member 74, is selectively coupled to the third intermediate coupling member 78 by the second clutch 70, and is selectively coupled to the ring gear 60 by the first clutch 68. The ring gear 60 is selectively coupled to the housing 14 by the first brake 62, and is selectively coupled to the first intermediate coupling member 74 by the first clutch 68. The planet carrier 58 is operatively connected to the output member 20.

FIG. 38B discloses a truth table 184 describing the engagement combinations of the brakes 62, 64, 66 and clutches 68, 70, 72 which establish nine forward speed ratios and two reverse speed ratios between the input member 16 and the output member 20 by way of the planetary gear sets 30, 32, 34, and 36 of the transmission 134 shown in FIG. 38A. In this embodiment, the planetary gear sets 30, 32, 34, and 36 are configured to have a ring-to-sun gear ratio $N_{ring}/N_{sun}$ of 3.50, 2.61, 2.54, and 1.94, respectively, to obtain the forward and reverse speed ratios noted in the truth table. The ring-to-sun gear ratios $N_{ring}/N_{sun}$ are exemplary, as components of the transmission may be modified to achieve different ratios.

INDUSTRIAL APPLICABILITY

While the foregoing transmission embodiments may be used in any machine having a multi-speed transmission, they have particular applicability in off-highway trucks and other heavy construction and mining machines. Such machines have specific gearing requirements that the disclosed transmission is capable of meeting, while allowing an engine of the machine to remain within a desired operating range.

For the purposes of the present disclosure, the term "desired operating range" includes those speeds and torques at which the engine experiences substantially stable and efficient operation. When operating outside the desired operating range, the engine may experience unstable operation such as, for example, overspeed situations, underspeed situations, lugging, and/or stalling. Efficiency losses may also be experienced by the engine when operating outside the desired operating range such as, for example, increased fuel consumption, increased exhaust emissions, increased engine temperatures, and/or decreased responsiveness.

The transmissions disclosed herein include a plurality of planetary gear assemblies and clutch arrangements that provide relatively uniform and closely spaced speed intervals that enhance performance and shift quality. The availability of nine forward gears may advantageously allow constant or nearly constant step ratios between shifts (referring to the truth tables), which become apparent when compared with earlier transmissions of fewer gear ratios or of varying step ratios. When the torque converter is in direct drive mode (i.e., when a torque converter lock-up clutch is engaged) the evenly-spaced step ratios between the transmission speed reductions may produce nearly constant utilization approaching the peak input power, with only minor deviations from the peak input power. Deviations from peak power utilization may result in machine inefficiency. Producing nearly constant utilization of peak input power ensures that the most efficient part of each drive ratio is fully utilized. The output speed of the engine (input speed of the transmission) may also be kept within a substantially narrow desired operating range, thereby resulting in efficient operation of the machine.

Reference will now be made to the operation of the multi-speed transmissions 100-134 as set forth in the truth tables 150-184, respectively. During operation of the machine, it is desirable to select a number of gear ratios to match the power output of the engine to a given load condition. Selection of the gear ratios may be made manually or automatically.

The truth table 150 for the multi-speed transmission 100 is shown at FIG. 3, and indicates that a first forward gear is selected by engaging the third clutch 72 to connect the planet carrier 40 to the planet carrier 46. Simultaneously, the first brake 62 is engaged to connect the ring gear 60 to the stationary housing 14 and the third brake 66 is engaged to connect the sun gear 38 to the housing 14. Selecting the gear ratio associated with this first forward gear provides a first forward gear ratio of approximately 6.22.

A shift to a second forward gear from first forward gear is accomplished by disengaging the third brake 66, maintaining engagement of the third clutch 72 and the first brake 62, and further engaging the first clutch 68 to connect the sun gear 38 to the planet carrier 46. A second forward gear ratio may be approximately 4.70.

A shift from the second forward gear to a third forward gear is accomplished by disengaging the first clutch 68 and engaging the second clutch 70. This connects the output member 20 to the ring gear 42 and sun gear 44. The third clutch 72 and first brake 62 remain engaged to provide a third forward gear ratio of approximately 3.38.

To shift from the third forward gear to a fourth forward gear, the second clutch 70 and first brake are disengaged and the second brake 64 is engaged to connect the ring gear 54 to the housing 14. Simultaneously, the third brake 66 is engaged to connect the sun gear 38 to the housing 14. As specified in FIG. 3, a fourth forward gear ratio may be approximately 2.68.

A shift from the fourth forward gear to a fifth forward gear is accomplished by disengaging the third brake 66 and engaging the first clutch 68. The third clutch 72 and second brake 64 remain engaged to provide a fifth forward gear ratio of approximately 2.02.

A shift from the fifth forward gear to a sixth forward gear is accomplished by disengaging the first clutch 68 and engaging the second clutch 70. The third clutch 72 and second brake 64 remain engaged to provide a sixth forward gear ratio of approximately 1.66.

To shift from the sixth forward gear to a seventh forward gear, the third clutch 72 is disengaged and the first clutch 68 is engaged. The second clutch 70 and second brake 64 remain engaged to provide a seventh forward gear ratio of approximately 1.20.

A shift from the seventh forward gear to an eighth forward gear is accomplished by disengaging the second brake 64 and engaging the third clutch 72. The first and second clutches 68, 70 remain engaged to provide an eighth forward gear ratio of approximately 1.00.

A shift from the eighth forward gear to a ninth forward gear is accomplished by disengaging the first clutch 68 and engaging the third brake 66. The second and third clutches 70, 72 remain engaged to provide a ninth forward gear ratio of approximately 0.69.

A first reverse gear is achieved by engaging the first clutch 68, the first brake 62, and the third brake 66. The first reverse gear ratio may be approximately −5.87.

A shift from the first reverse gear to a second reverse gear is accomplished by disengaging the first brake 62 and engaging the second brake 64. The first clutch 68 and third brake 66 remain engaged to provide a second reverse gear ratio of approximately −2.53.

While the foregoing description identifies nine forward gears and two reverse gears, the transmission configuration shown in FIG. 2 is capable of additional gears by engaging other combinations of clutches 68/70/72 and brakes 62/64/66.

The truth table 151 for the multi-speed transmission 101 is shown at FIG. 5, and indicates that a first forward gear is selected by engaging the first brake 62 to connect the ring gear 60 to the housing 14. Simultaneously, the second brake 64 is engaged to connect the sun gear 38 to the housing 14, and the third brake 66 is engaged to connect the sun gear 44 to the stationary housing 14. Selecting the gear ratio associated with this first forward gear provides a first forward gear ratio of approximately 6.93.

A shift to a second forward gear from first forward gear is accomplished by disengaging the third brake 66, maintaining engagement of the first brake 62 and second brake 64, and further engaging the third clutch 72 to connect the input member 16 to the sun gear 44. A second forward gear ratio may be approximately 4.95.

A shift from the second forward gear to a third forward gear is accomplished by disengaging the third clutch 72 and engaging the second clutch 70. This connects the sun gear 56 to each of the ring gear 54, the sun gear 50, and the ring gear 48. The first brake 62 and second brake 64 remain engaged to provide a third forward gear ratio of approximately 4.10.

To shift from the third forward gear to a fourth forward gear, the second brake 64 is disengaged and the third clutch 72 is engaged. As specified in FIG. 5, a fourth forward gear ratio may be approximately 3.00.

A shift from a fourth forward gear to a fifth forward gear is accomplished by disengaging the third clutch 72 and engaging the third brake 66. The second clutch 70 and first brake 62 may remain engaged to provide a fifth forward gear ratio of approximately 2.20.

A shift from the fifth forward gear to a sixth forward gear is accomplished by disengaging the second clutch 70 and first brake 62, and engaging the first clutch 68. The second brake 64 is also simultaneously engaged. The third brake 66 may remain engaged to provide a sixth forward gear ratio of approximately 1.58.

To shift from the sixth forward gear to a seventh forward gear, the third brake 66 is disengaged and the second clutch 70 is engaged. The first clutch 68 and second brake 64 remain engaged to provide a seventh forward gear ratio of approximately 1.37.

A shift from the seventh forward gear to an eighth forward gear is accomplished by disengaging the second brake 64 and engaging the third clutch 72. The first and second clutches 68, 70 remain engaged to provide an eighth forward gear ratio of approximately 1.00.

A shift from the eighth forward gear to a ninth forward gear is accomplished by disengaging the third clutch 72 and engaging the third brake 66. The first and second clutches 68, 70 remain engaged to provide a ninth forward gear ratio of approximately 0.73.

A first reverse gear is achieved by engaging the first clutch 68, the third clutch 72, and the first brake 62. The first reverse gear ratio may be approximately −6.37.

A shift from the first reverse gear to a second reverse gear is accomplished by disengaging the third clutch 72 and engaging the third brake 66. The first clutch 68 and first brake 62 remain engaged to provide a second reverse gear ratio of approximately −4.66.

While the foregoing description identifies nine forward gears and two reverse gears, the transmission configuration shown in FIG. 4 is capable of additional gears by engaging other combinations of clutches 68/70/72 and brakes 62/64/66.

The truth tables provided in FIGS. 6B to 38B describe the engagement combinations of clutches and brakes which establish nine forward gears and two reverse gears, and a gear ratio corresponding to each gear, for each of the transmissions illustrated in FIGS. 6A to 38A, respectively. The clutches are generally identified by the reference numbers 68, 70, and 72, and the brakes by the reference numbers 62, 64, and 66 in both the transmission schematic and the truth table. In each embodiment, the transmission includes four planetary gear sets and six control elements which provide at least nine forward gear ratios and two reverse gear ratios. Furthermore, each transmission may be capable of providing additional gears by engaging clutch and/or brake combinations not shown in the truth tables.

In view of the foregoing, it can be appreciated that the transmission embodiments disclosed herein use a reduced number of control elements with a four planetary gear set transmission to provide nine forward gear ratios and two reverse gear ratios. The plurality of clutches and brakes selectively couple various components for achieving the gear ratios required to keep the power source within a desired speed range thereby providing improved efficiency.

It will be apparent to those skilled in the art that various modifications and variations can be made in the disclosed transmission assemblies without departing from the scope of the disclosure. Other embodiments of the disclosed transmission will be apparent to those skilled in the art from consideration of the specification and practice of the transmission disclosed herein. It is intended that the specification and examples be considered as exemplary only, with a true scope of the disclosure being indicated by the following claims and their equivalents.

What is claimed is:

1. A multi-speed transmission, comprising:
   an input member and an output member disposed in a stationary housing;
   a first planetary gear set, a second planetary gear set, a third planetary gear set, and a fourth planetary gear set, each of the first, second, third, and fourth planetary gear sets disposed in the stationary housing and including a sun gear, a planet carrier, and a ring gear;

a first intermediate coupling member continuously connecting the ring gear of the first planetary gear set with the sun gear of the second planetary gear set;

a second intermediate coupling member continuously connecting the ring gear of the second planetary gear set with the sun gear of the third planetary gear set;

a third intermediate coupling member continuously connecting the planet carrier of the third planetary gear set with the ring gear of the fourth planetary gear set;

a fourth intermediate coupling member continuously connecting the sun gear of the third planetary gear set with the sun gear of the fourth planetary gear set; and six torque control elements operably coupled to the planetary gear sets and selectively engageable to create a set of different gear ratios between the input member and the output member, the set of different gear ratios including at least nine forward gear ratios and at least two reverse gear ratios.

2. The multi-speed transmission of claim 1, in which a first of the six torque control elements selectively connects the sun gear of the first planetary gear set with the planet carrier of the second planetary gear set.

3. The multi-speed transmission of claim 2, in which a second of the six torque control elements selectively connects the sun gear of the second planetary gear set with output member.

4. The multi-speed transmission of claim 3, in which a third of the six torque control elements selectively connects the planet carrier of the first planetary gear set with the planet carrier of the second planetary gear set.

5. The multi-speed transmission of claim 4, in which a fourth of the six torque control elements selectively connects the ring gear of the fourth planetary gear set with the stationary housing.

6. The multi-speed transmission of claim 5, in which a fifth of the six torque control elements selectively connects the ring gear of the third planetary gear set with the stationary housing.

7. The multi-speed transmission of claim 6, in which a sixth of the six torque control elements selectively connects the sun gear of the first planetary gear set with the stationary housing.

8. The multi-speed transmission of claim 7, in which the input member is continuously connected with the planet carrier of the first planetary gear set.

9. The multi-speed transmission of claim 8, in which the output member is continuously connected to the planet carrier of the fourth planetary gear set.

10. The multi-speed transmission of claim 9, in which the first, second and third torque control elements respectively comprise first, second, and third clutches.

11. The multi-speed transmission of claim 10, in which the fourth, fifth, and sixth torque control elements respectively comprise first, second, and third brakes.

12. The multi-speed transmission of claim 7, in which:

a first reverse gear ratio is provided when first, fourth, and sixth torque control elements are engaged and the second, third, and fifth torque control elements are disengaged; and a second reverse gear ratio is provided when the first, fifth, and sixth torque control elements are engaged and the second, third, and fourth torque control elements are disengaged.

13. A multi-speed transmission, comprising:

an input member and an output member disposed in a stationary housing;

a first planetary gear set, a second planetary gear set, a third planetary gear set, and a fourth planetary gear set, each of the first, second, third, and fourth planetary gear sets disposed in the stationary housing and including a sun gear, a planet carrier, and a ring gear;

six torque control elements operably coupled to the first, second, third, and fourth planetary gear sets and selectively engageable to create a set of different gear ratios between the input member and the output member, the set of different gear ratios including at least nine forward gear ratios and at least two reverse gear ratios;

wherein the input member is continuously connected with the planet carrier of the second planetary gear set;

wherein the output member is continuously connected with the planet carrier of the fourth planetary gear set;

a first intermediate coupling member continuously connecting the ring gear of the first planetary gear set with the sun gear of the second planetary gear set;

a second intermediate coupling member continuously connecting the ring gear of the second planetary gear set with the sun gear of the third planetary gear set;

a third intermediate coupling member continuously connecting the planet carrier of the third planetary gear set with the ring gear of the fourth planetary gear set;

a fourth intermediate coupling member continuously connecting the sun gear of the third planetary gear set with the sun gear of the fourth planetary gear set;

a first of the six torque control elements selectively connecting the sun gear of the first planetary gear set with the planet carrier of the second planetary gear set;

a second of the six torque control elements selectively connecting the sun gear of the second planetary gear set with output member;

a third of the six torque control elements selectively connecting the planet carrier of the first planetary gear set with the planet carrier of the second planetary gear set;

a fourth of the six torque control elements selectively connecting the ring gear of the fourth planetary gear set with the stationary housing;

a fifth of the six torque control elements selectively connecting the ring gear of the third planetary gear set with the stationary housing; and a sixth of the six torque control elements selectively connecting the sun gear of the first planetary gear set with the stationary housing.

14. The multi-speed transmission of claim 13, in which in which the first, second and third torque control elements respectively comprise first, second, and third clutches.

15. The multi-speed transmission of claim 14, in which the fourth, fifth, and sixth torque control elements respectively comprise first, second, and third brakes.

16. The multi-speed transmission of claim 13, in which:

a first reverse gear ratio is provided when first, fourth, and sixth torque control elements are engaged and the second, third, and fifth torque control elements are disengaged; and a second reverse gear ratio is provided when the first, fifth, and sixth torque control elements are engaged and the second, third, and fourth torque control elements are disengaged.

17. A multi-speed transmission, comprising:

a stationary housing;

an input member associated with the stationary housing;

an output member associated with the stationary housing;

a first planetary gear set, a second planetary gear set, a third planetary gear set, and a fourth planetary gear set, each of the first, second, third, and fourth planetary gear sets disposed in the stationary housing and including a sun gear, a planet carrier, and a ring gear;

a first intermediate coupling member continuously connected to the sun gear of the first planetary gear set and selectively connected to the stationary housing by a first brake;

a second intermediate coupling member continuously connected to the planet carrier of the first planetary gear set;

a third intermediate coupling member continuously connected to the planet carrier of the second planetary gear set, selectively connected to the first intermediate coupling member by a first clutch, and selectively connected to the second intermediate coupling member by a second clutch;

a fourth intermediate coupling member continuously connecting the ring gear of the first planetary gear set with the sun gear of the second planetary gear set;

a third clutch selectively connecting the fourth intermediate coupling member to the output member;

a fifth intermediate coupling member continuously connecting the ring gear of the second planetary gear set with the sun gear of the third planetary gear set;

a sixth intermediate coupling member continuously connecting the sun gear of the third planetary gear set with the sun gear of the fourth planetary gear set;

a seventh intermediate coupling member continuously connecting the planet carrier of the third planetary gear set with the ring gear of the fourth planetary gear set;

a second brake selectively connecting the ring gear of the third planetary gear set with the stationary housing;

a third brake selectively connecting the ring gear of the fourth planetary gear set with the stationary housing; and wherein the first, second, and third clutches and the first, second, and third brakes are selectively engageable to create a set of different gear ratios between the input member and the output member, the set of different gear ratios including at least nine forward gear ratios and at least two reverse gear ratios.

18. The multi-speed transmission of claim 17, in which the input member is continuously connected with the planet carrier of the first planetary gear set.

19. The multi-speed transmission of claim 18, in which the output member is continuously connected to the planet carrier of the fourth planetary gear set.

20. The multi-speed transmission of claim 17, in which:

a first reverse gear ratio is provided when the first clutch, first brake, and third brake are engaged and the second clutch, third clutch, and second brake are disengaged; and a second reverse gear ratio is provided when the first clutch, first brake, and second brake are engaged and the second clutch, third clutch, and third brake are disengaged.

* * * * *